(12) United States Patent
Phuly

(10) Patent No.: US 7,003,893 B1
(45) Date of Patent: *Feb. 28, 2006

(54) METHOD AND APPARATUS FOR UNIVERSAL SHAPE CUTTING OF PIPES

(76) Inventor: Ahmed Phuly, 152 122nd Ave. NW., Coon Rapids, MN (US) 55448

( * ) Notice: Subject to any disclaimer, the term of this patent is extended or adjusted under 35 U.S.C. 154(b) by 0 days.

This patent is subject to a terminal disclaimer.

(21) Appl. No.: 10/812,270

(22) Filed: Mar. 29, 2004

Related U.S. Application Data

(63) Continuation-in-part of application No. PCT/US02/28144, filed on Sep. 27, 2002, which is a continuation-in-part of application No. 10/084,124, filed on Feb. 25, 2002, now Pat. No. 6,601,312.

(60) Provisional application No. 60/326,082, filed on Sep. 29, 2001.

(51) Int. Cl.
*G01B 5/20* (2006.01)

(52) U.S. Cl. .................. 33/529; 33/561.1; 33/561.2; 33/412

(58) Field of Classification Search ............... 33/529, 33/1 G, 412, 533, 613, 626, 628, 632, 638, 33/645, DIG. 1, 21.1, 21.3, 27.12, 561.1–561.3, 33/21.2
See application file for complete search history.

(56) References Cited

U.S. PATENT DOCUMENTS

| | | | | |
|---|---|---|---|---|
| 2,408,517 A | * | 10/1946 | Howard | 33/21.3 |
| 2,990,169 A | * | 6/1961 | Wheeler | 266/56 |
| 3,166,620 A | * | 1/1965 | Galezniak | 266/56 |
| 3,464,685 A | * | 9/1969 | Schreib | 266/56 |
| 6,244,189 B1 | | 6/2001 | Kingsley | |
| 6,407,655 B1 | | 6/2002 | Kitamura | |
| 6,627,004 B1 | | 9/2003 | Lockhart | |

* cited by examiner

*Primary Examiner*—Christopher W. Fulton
*Assistant Examiner*—Tania Courson
(74) *Attorney, Agent, or Firm*—Nikolai & Mersereau, P.A.

(57) ABSTRACT

The present invention pertains to a method and apparatus for obtaining templates used in pipe end cutting essential in fabricating saddle and mitered pipe connections. The template is made by an array of z-shaped pins arranged radially to form the shape of a stepped cylinder. A flexible adjustable length track on the z shaped pins or on another set of pins forms a track for a roller on a tool to follow. This track replaces metal templates, which have to be specially made for cutting each shape and size pipe for pipe connections to other pipes or to boilers and other devices. The invention provides a large array of templates for one or more sizes of pipe eliminating the need to have a large number of templates for different pipe sizes and shapes. A miter table attachment can be used for off center pipe connection cuts.

31 Claims, 43 Drawing Sheets

METHOD AND APPARATUS FOR UNIVERSAL SHAPE CUTTING OF PIPES

This is a continuation-in-part of international application PCT/US02/28144 filed 27 Sep. 2002, which is a continuation-in-part of Ser. No. 10/084,124, now U.S. Pat. No. 6,601,312 filed Feb. 25, 2002, which is related to a provisional Ser. No. 60/326,082 filed Sep. 29, 2001.

BACKGROUND OF THE INVENTION

1. Field of the Invention

This invention relates to a method and apparatus for pipe-end shaping and welding for pipe connections and more particularly to a plurality of pins having a track on one end for forming a template for pipe end shapes or for shapes in general. The pins engage the contour of the surface to be cut or welded.

2. Description of the Related Art

In many industrial applications, such as mechanical piping, pressure vessels and steel construction, it is often necessary to join one pipe to another or to other receiving components. The pipe fitting process usually involves shape cutting of the pipe end. The cutting is always done so that the pipe end contour matches the geometry of intersection of the pipe with the other receiving component. The fabrication process may also require beveling the pipe end along the cut line in order to receive the proper welding.

The most commonly used tools for cutting and beveling pipe ends are pipe beveling machines, also known as short saddle machines. Some of the commercially available pipe beveling machines are equipped to receive shape cutting attachments known as guide templates or shape cutting attachments. These metal guide templates allow the user to cut and bevel contoured pipe ends for saddle connections such as T-joints and miter angles. Shape cutting attachments are always of cylindrical shape with one end contoured, and the other end equipped with a set of small bolting brackets. The square end is fitted to the face of the beveling machine, then the torch ruler of a short saddle machine is engaged with the contoured edge of the metal guide. With the torch ignited, the torch arm mechanism is rotated using manual or mechanical devices. A spring tension, exerted on the roller, causes the roller to follow the shaped end of the metal template, duplicating the shape of the pattern.

A pre-fabricated template is used to produce a single specific shape-cut. To cut a pipe end to take a specific contour, a specific corresponding guide template will have to be used. The fabricator can not use a pipe-beveling machine to cut or bevel pipe ends to shape, if the corresponding metal guide template is not available. This drawback limits the fabricator's options to either shape-cut pipes using a hand held torch or to keep on hand a large number of guide templates. Hand held torch cutting does not yield accurate results and usually requires additional grinding and filing. It is also very difficult to maintain a beveling angle while using a hand held torch. The process of custom making a metal guide template is complicated and involves several steps. The first step involves drawing the unfolded shape of the guide template. The next steps are marking, cutting, rolling and welding a metal sheet. The process of drawing the unfolded shape of the template requires a great deal of knowledge of descriptive geometry methods and manual or CAD drafting. Programmable pipe shape cutters are very expensive and require highly skilled workers to operate. Programmable pipe shape-cutters usually produce a limited number of standard shape cuts corresponding to commonly used pipe connections.

The prior art, involving layout of pipe connection templates, may require both joining components to be brought together and positioned at the desired orientation with respect to each other. That process requires both time and physical effort. The effort involves moving, lifting, and building temporary fixtures to hold both joining components in a specific position. It also requires tedious measuring. The larger the size of the joining components, the greater the amount of physical work involved.

Both manual and CAD drafting methods can be utilized to derive the unfolded shape of the widely used metal guide template, from the pipe connection template however this prior art is considered tedious and time consuming.

BRIEF SUMMARY OF THE INVENTION

The present invention pertains to an apparatus and a method for fabricating pipe connections involving pipe-end shape cutting. It provides a cost-effective system for pipe end universal shape cutting and beveling. In one embodiment of the invention the system 1 consists of three devices referred to as: (a) the universal template, (b) the template adapter and (c) the miter table. The three mentioned devices work together and inter-connect. An aspect of this invention is to allow a cutting torch of a pipe saddle machine to follow a flexible track, cutting and beveling a pipe end for a smooth shape-cut. The flexible track can be secured in place to form any shaped smooth surface guide template. One objective of the present invention is to eliminate the need to keep on hand a large number of pre-fabricated metal guides.

The universal template is generally shown is shown in FIG. 1 as 1A. It comprises a plurality of pins arrayed in a the shape of a cylinder, a pin sleeve with a locking mechanism to hold the pins in place, an adjustable flexible moving track on one end of the pins, and stationary cylindrical sleeve with a mounting flange for attaching a working tool.

The universal template relies on a template adapter, to generate the shape of the track template. The current invention relates to a method of generating the track template for any given pipe end shape-cut, using the template adapter. The template adapter is made of a full array of Z-shaped pins arranged radially to form the shape of a stepped cylinder. One side of the template adapter has a diameter equal to the outer diameter of the pipe, while the other side has a diameter equal to the stationary pipe sleeve of the universal template. As the narrow side of the adapter takes the shape of the connection template, the pins will slide, along the adapter's wide sleeve and the adapter's narrow sleeve, allowing the wide side to take the shape of the desired track template. The track template is transferred onto the universal template to be used for shape cutting. The template adapter provides a simple and direct generation of the desired track template. The objective of the template adapter is to eliminate the complex process of deriving and drawing the unfolded shape of a guide template.

The template adapter can be used with a miter table for a precise and quick method of relative positioning of the template adapter with respect to a receiving component or its representative. The miter table provides means for quick relative positioning of the template adapter with respect to a receiving object, allowing the template adapter to generate both connection templates and track templates for miter cuts, concentric, or offset pipe connections.

The template adaptor can be used with a set of lightweight curved plates employed with the system 1 or 1' for the template generating process. Each curved plate represents a portion of a large pipe or a large diameter shell such as a boiler. Each of the said curved plates is labeled with a size tag showing the nominal or actual diameter of the represented shell. The curved plates are made of plastic or light metal and cover a wide range of pipe and large shell diameters. The objectives of the lightweight plates are to minimize the physical effort involved in the fabrication process, and to generate the connection and track templates without having the two joining components present during that process.

OBJECTS OF THE INVENTION

It is an object of the invention to provide a smooth and accurate shape track for cutting, beveling and welding tools to follow to better quality pipe connections.

It is an object of the invention to improve shape transfers from one surface to another.

It is an object of the invention to eliminate trace approximations caused by pins causing a step function trace.

It is an object of the invention to improve the quality and accuracy of cutting beveling and welding pipe connections.

It is an object of the invention to position offsets of pipes with greater accuracy when connecting the pipes.

It is an object of the invention to eliminate the use of paper templates.

It is an object of the invention to eliminate shape cutting using a hand held torch.

It is an object of the invention to eliminate the need to have multiple sets of metal templates used to cut pipe connections.

It is an object of the invention to eliminate errors introduced by multiple steps of approximations in cutting pipes for pipe connections.

It is an object of the invention to bevel pipes at correct angles for improved fits of pipes in pipe connections.

It is an object of the invention to improve the weld quality of pipe connections to eliminate leaks and reworking of welds.

It is an object of the invention to form templates for and cut complicated pipe ends.

It is an object of the invention to automatically cut pipe ends from a template for (non standard) pipe connections, including connections with the receiving component having an irregular geometry.

It is an object of the invention to prepare pipe connections without having the receiving component present.

It is an object of the invention to produce templates for cutting large sized pipe ends where the pipes from curved plates avoiding having to work with large heavy pipes.

It is an object of the invention to improve the quality of fabrication of pipe connections comprising acute angles or offsets or a combination of both.

It is an object of the invention to increase the productivity of pipe connection layout and fabrication.

It is an object of the invention to use one device to prepare a pipe end by shape cutting, beveling, (or welding), covering a wide range of pipe sizes and connection configurations for both field and shop fabrication.

Other objects, advantages and novel features of the present invention will become apparent from the following description of the preferred embodiments when considered in conjunction with the accompanying drawings.

DETAILED DESCRIPTION OF THE PREFERRED EMBODIMENT

Figure 1:
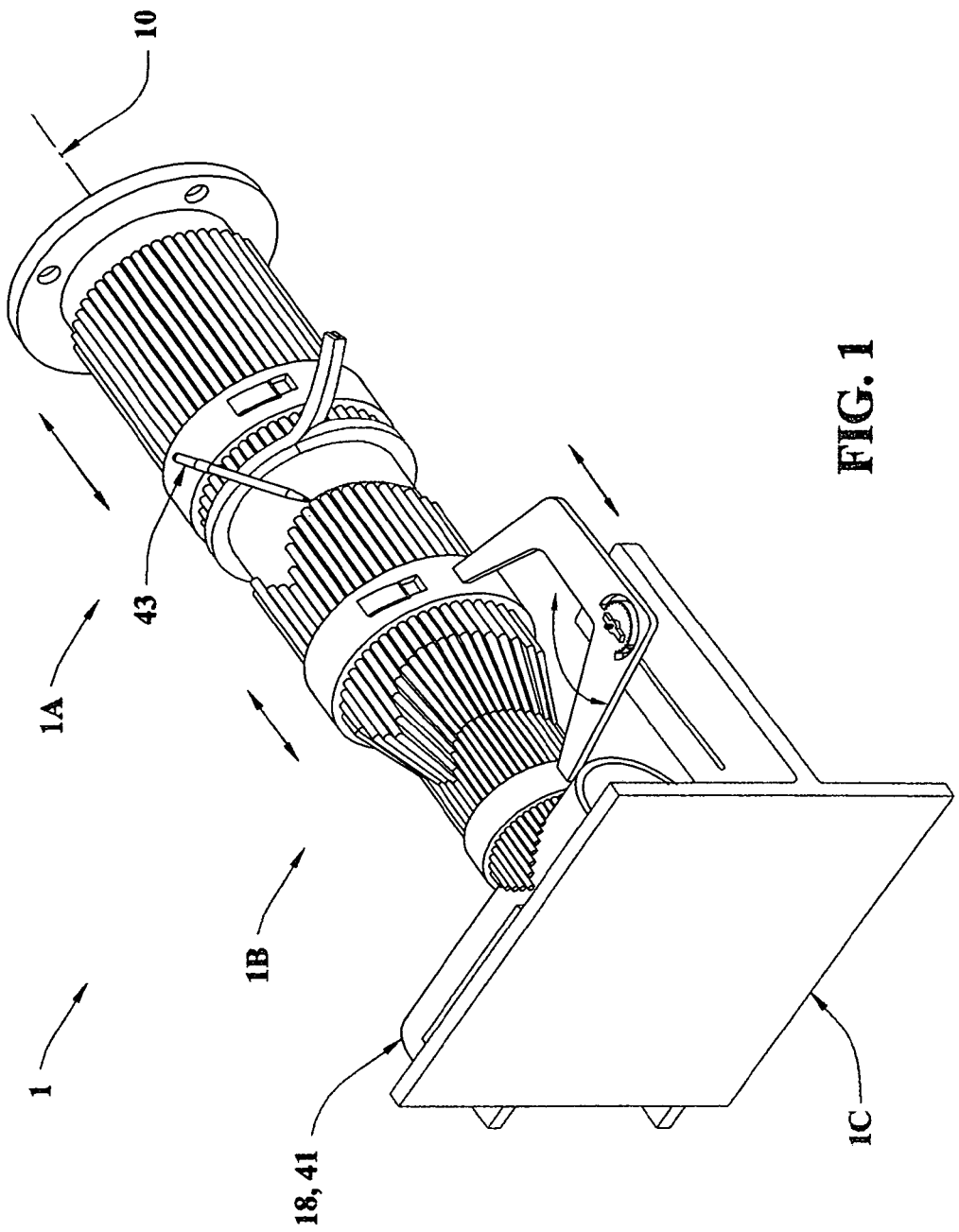
FIG. 1 shows an isometric view of the universal template 1A interconnected to the template adapter 1B and the miter table 1C. The system is use on a receiving component 41, being positioned on the miter table 1C and the track template being marked onto the universal template 1A using a marker 43.
Figure 2:
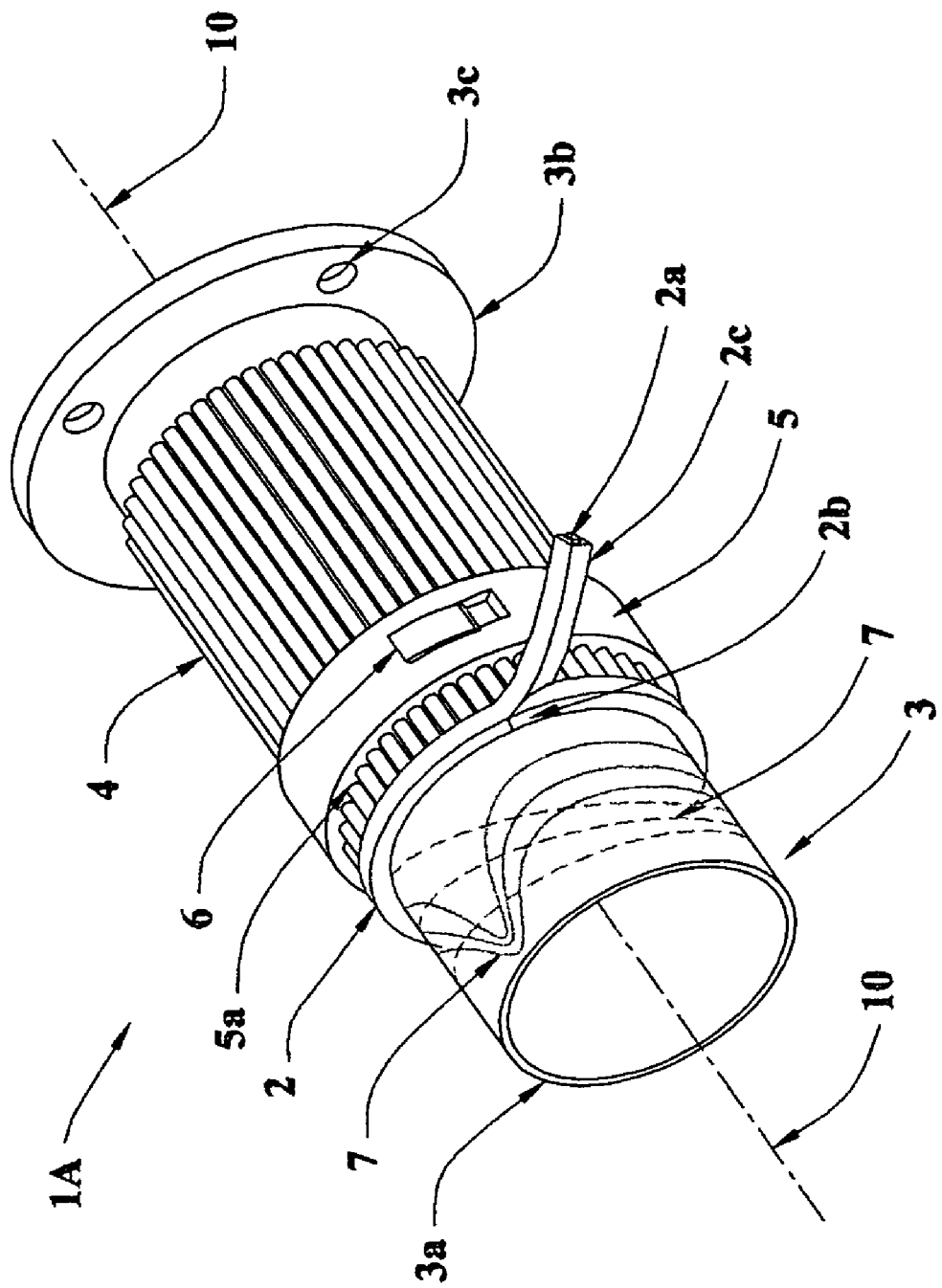
FIG. 2 shows an isometric view of the universal template 1A.
Figure 3:
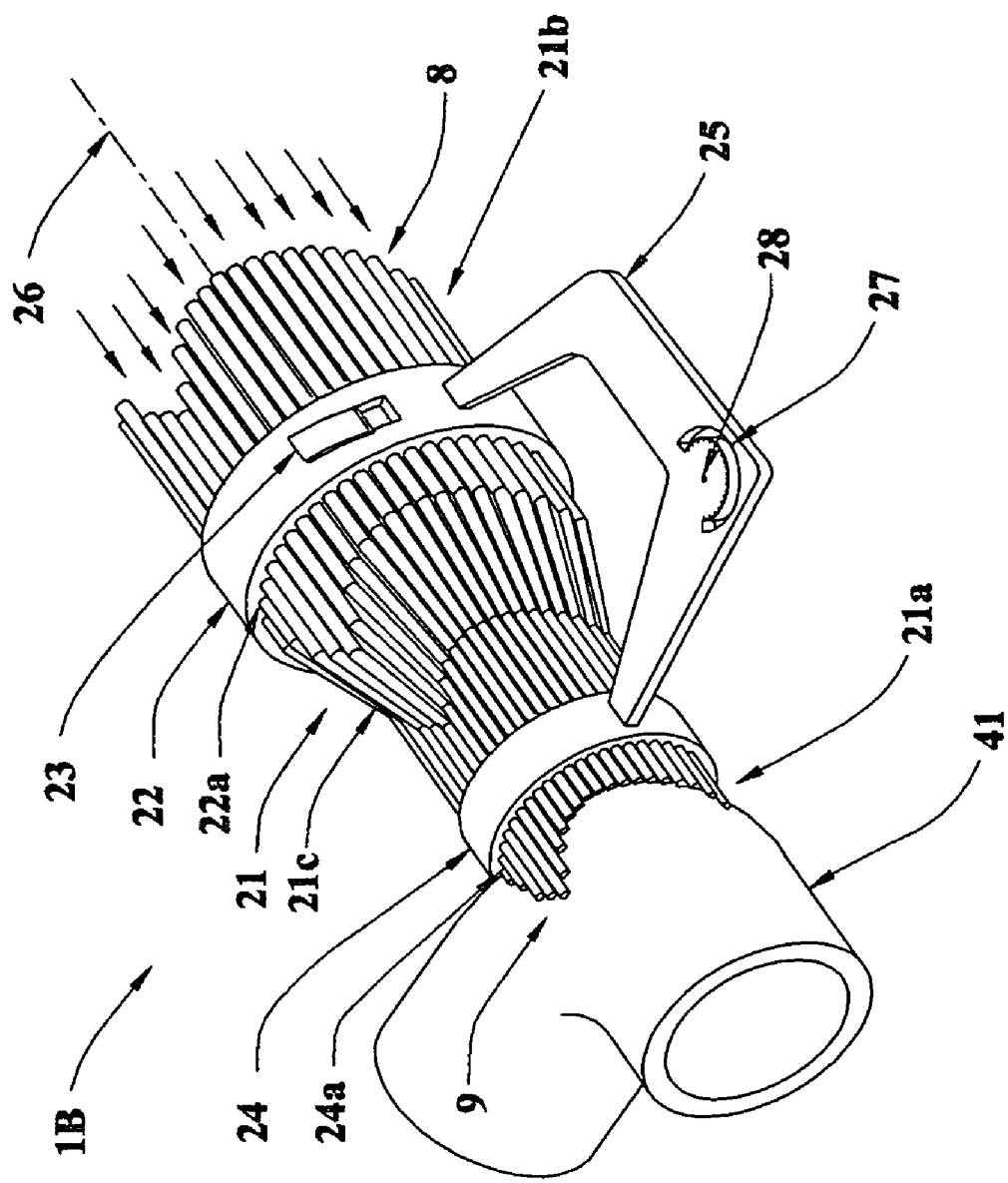
FIG. 3 shows an isometric view of the template adapter 1B pushed against a receiving component.
Figure 4:
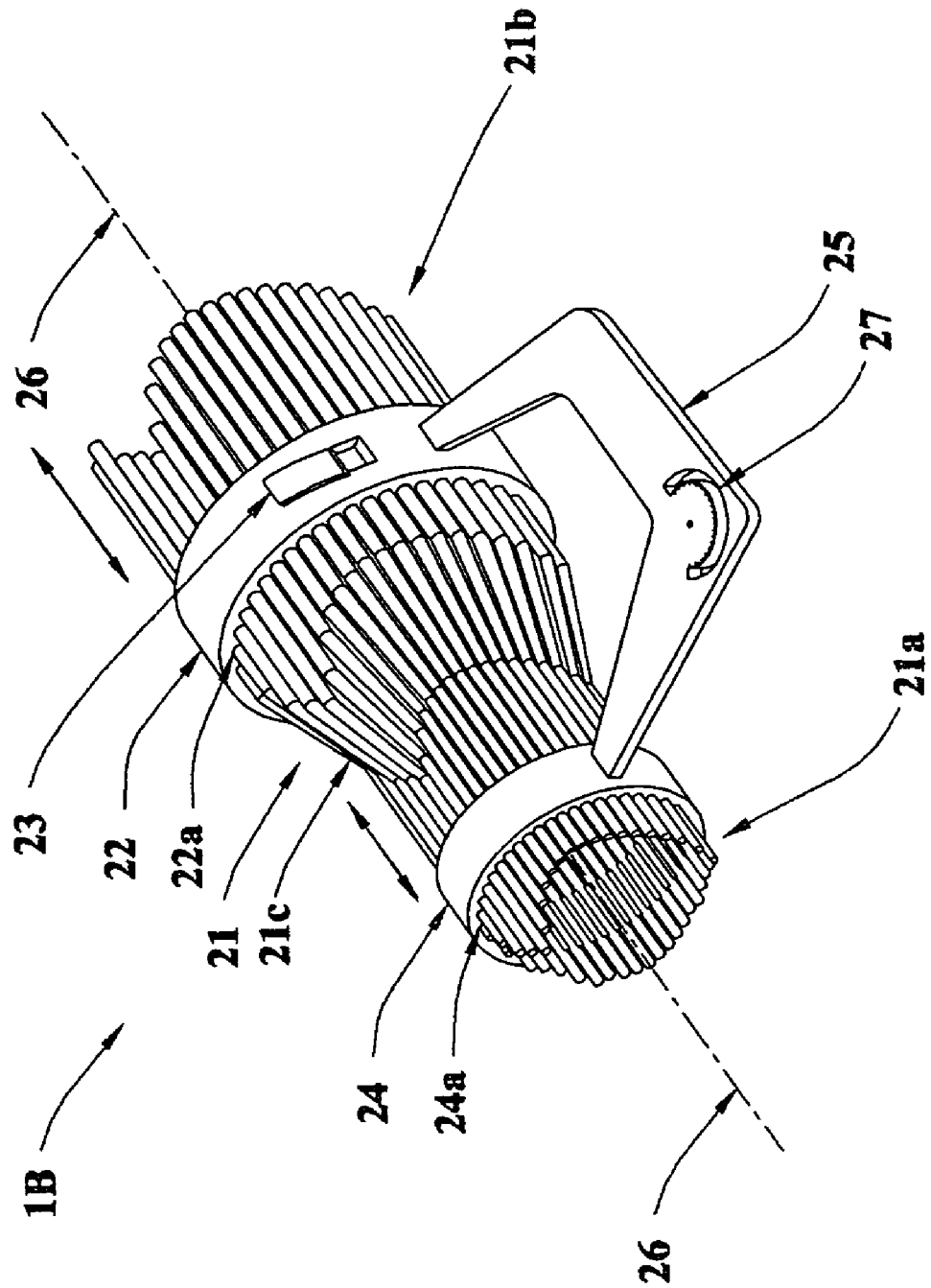
FIG. 4 shows an isometric view of the template adapter 1B.
Figure 5:
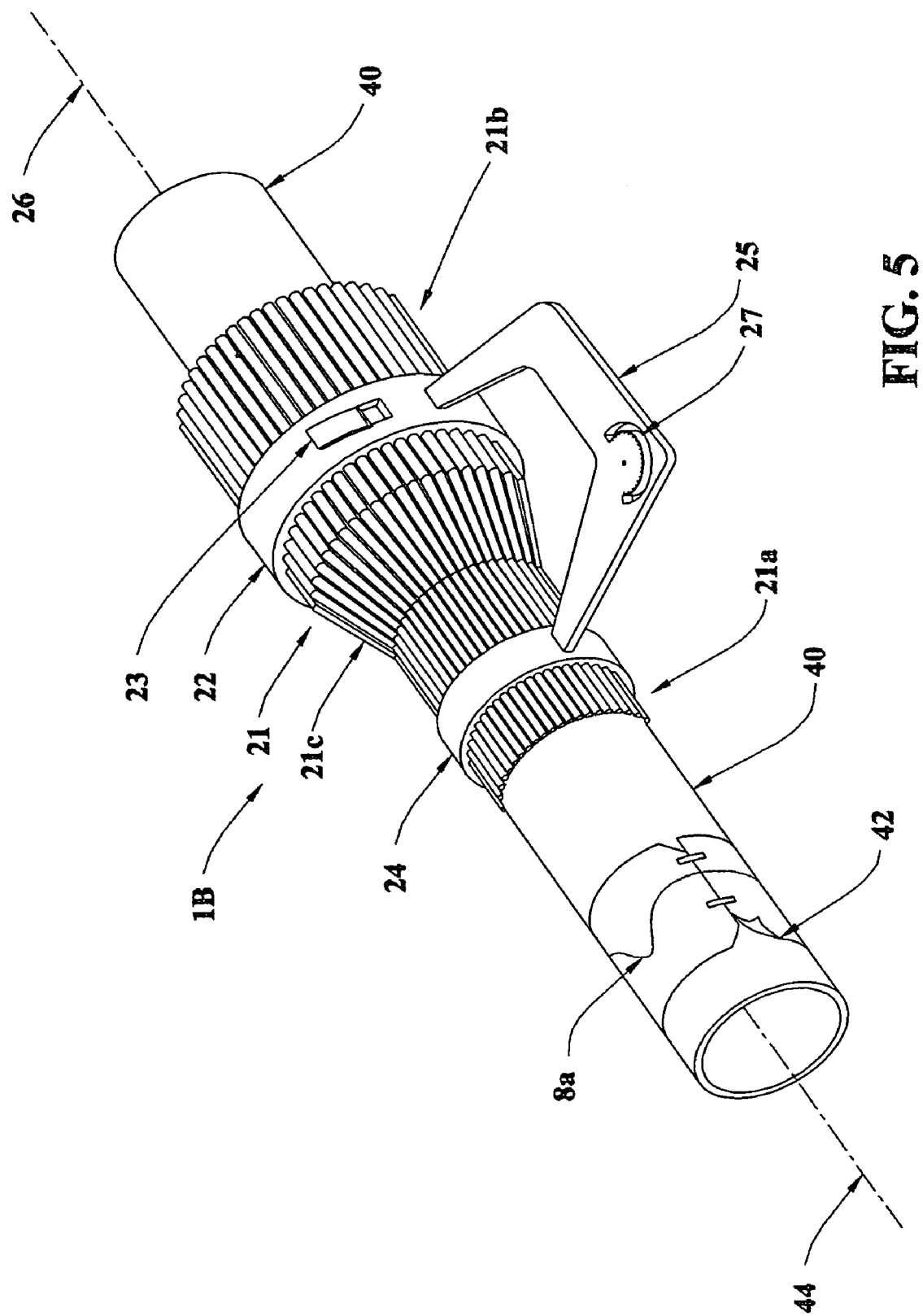
FIG. 5 shows an isometric view of the universal template 1A slipped over a pipe with a paper template wrapped around the pipe.
Figure 6:
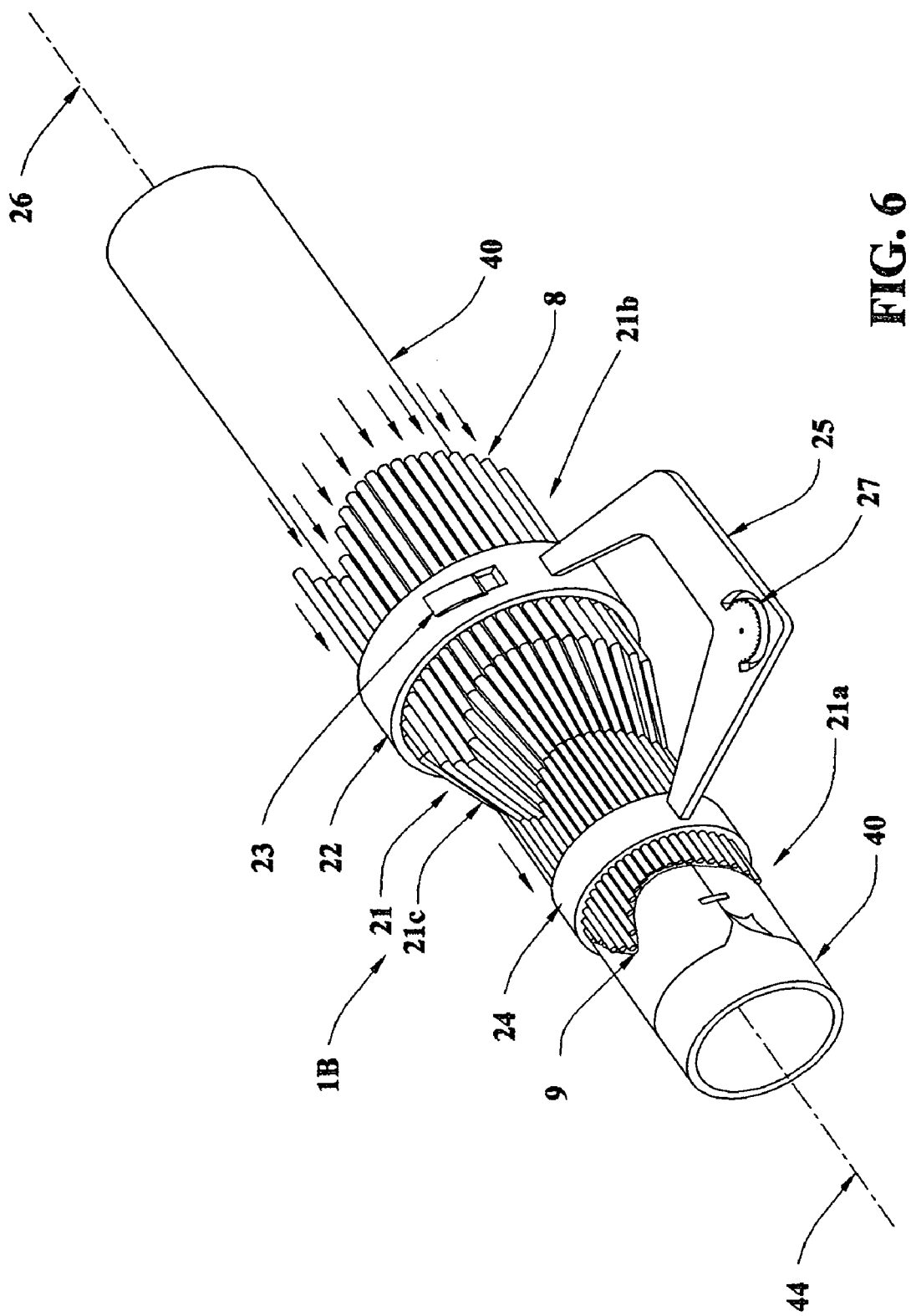
FIG. 6 shows an isometric view of the universal template 1A with its narrow end formed to take the shape of the pattern on the paper template. The template adapter 1B fixes the pins in place and creates the connection template 9 and the track template 8 for fabricating the connection.
Figure 7:
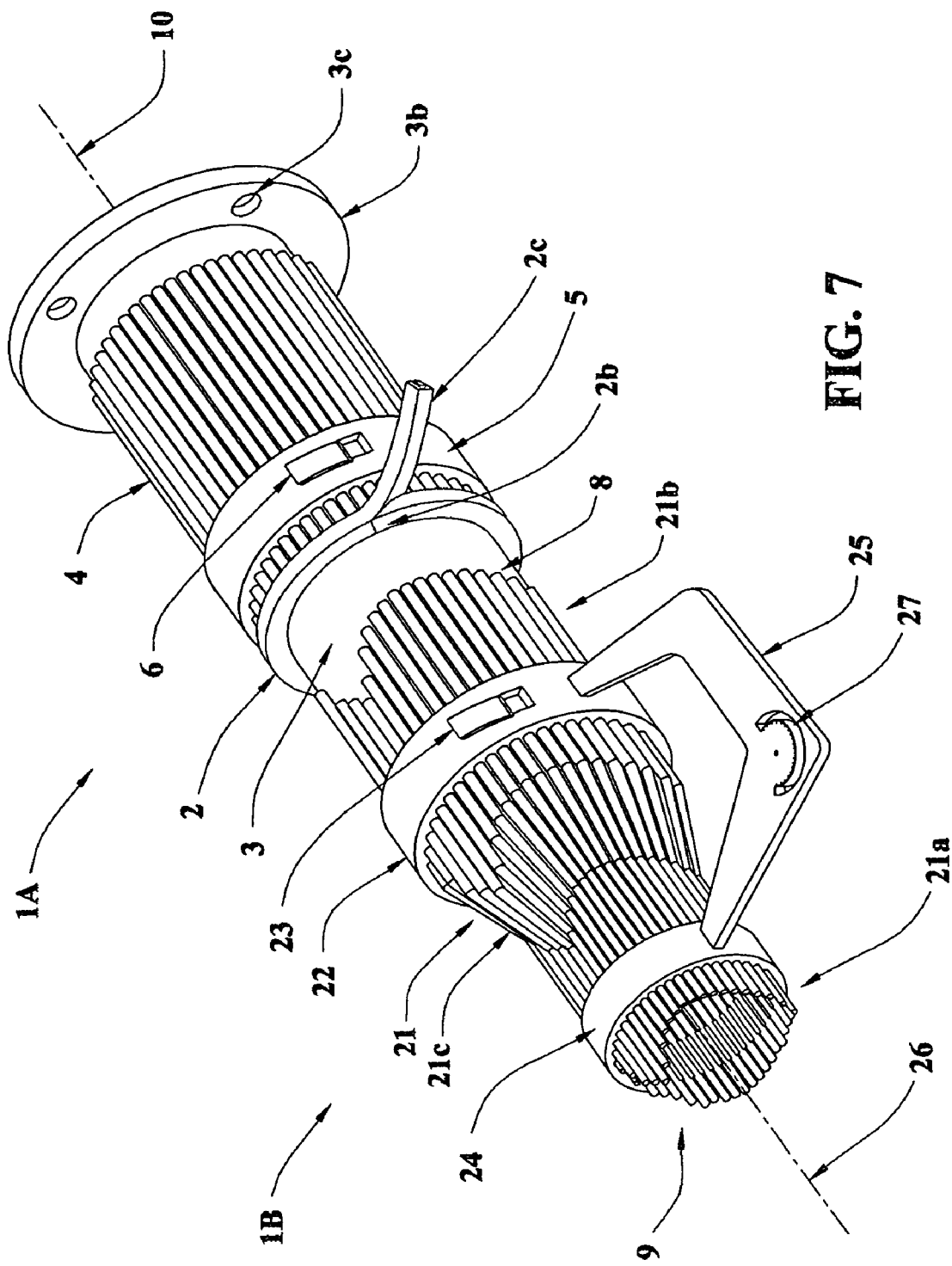
FIG. 7 shows an isometric view of the template adapter 1B slipped over the universal template 1A.
Figure 8:
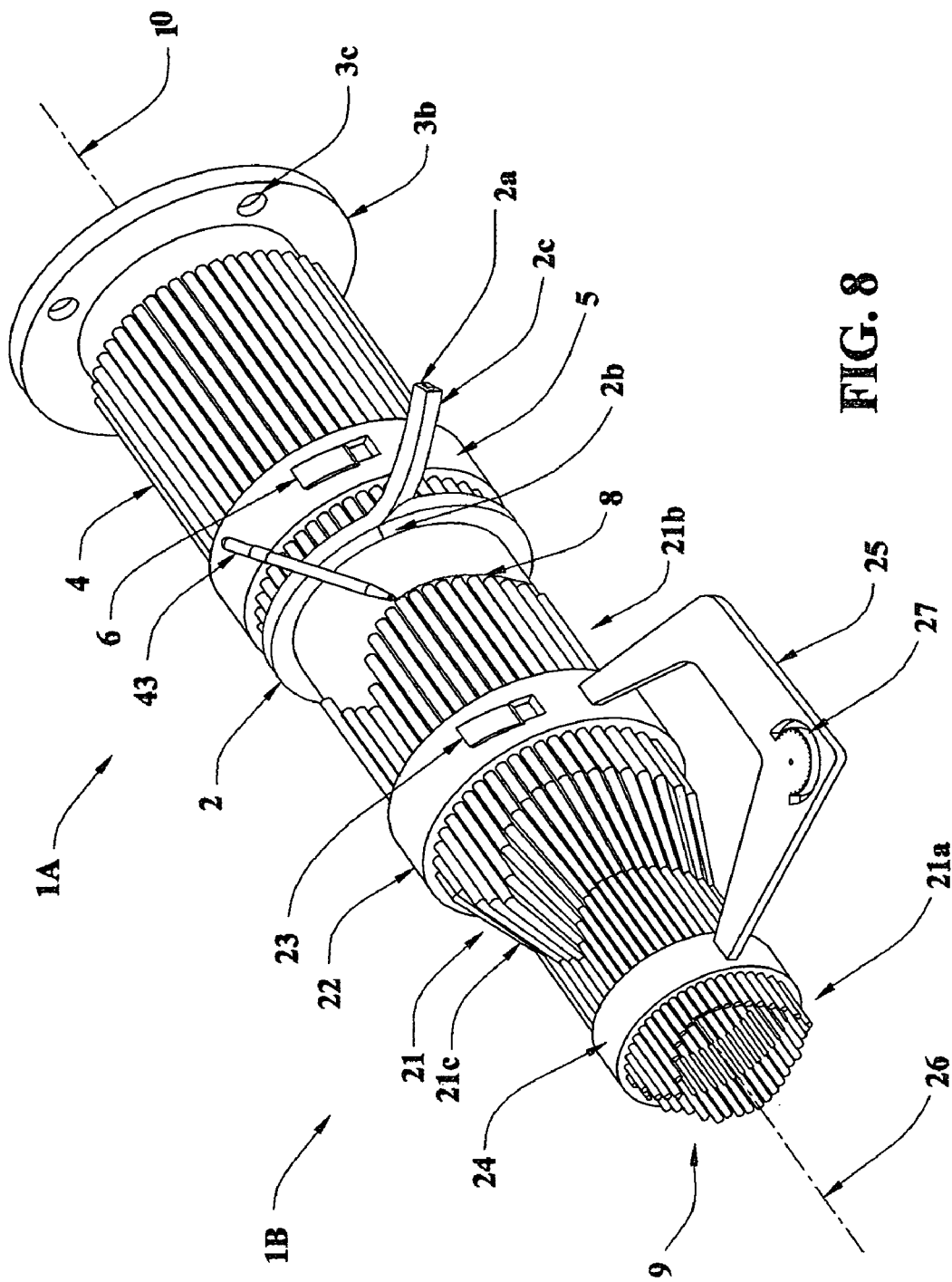
FIG. 8 shows the isometric view of FIG. 7 with the shape of the track template being transferred and marked onto the surface of the cylindrical stationary sleeve.
Figure 9:
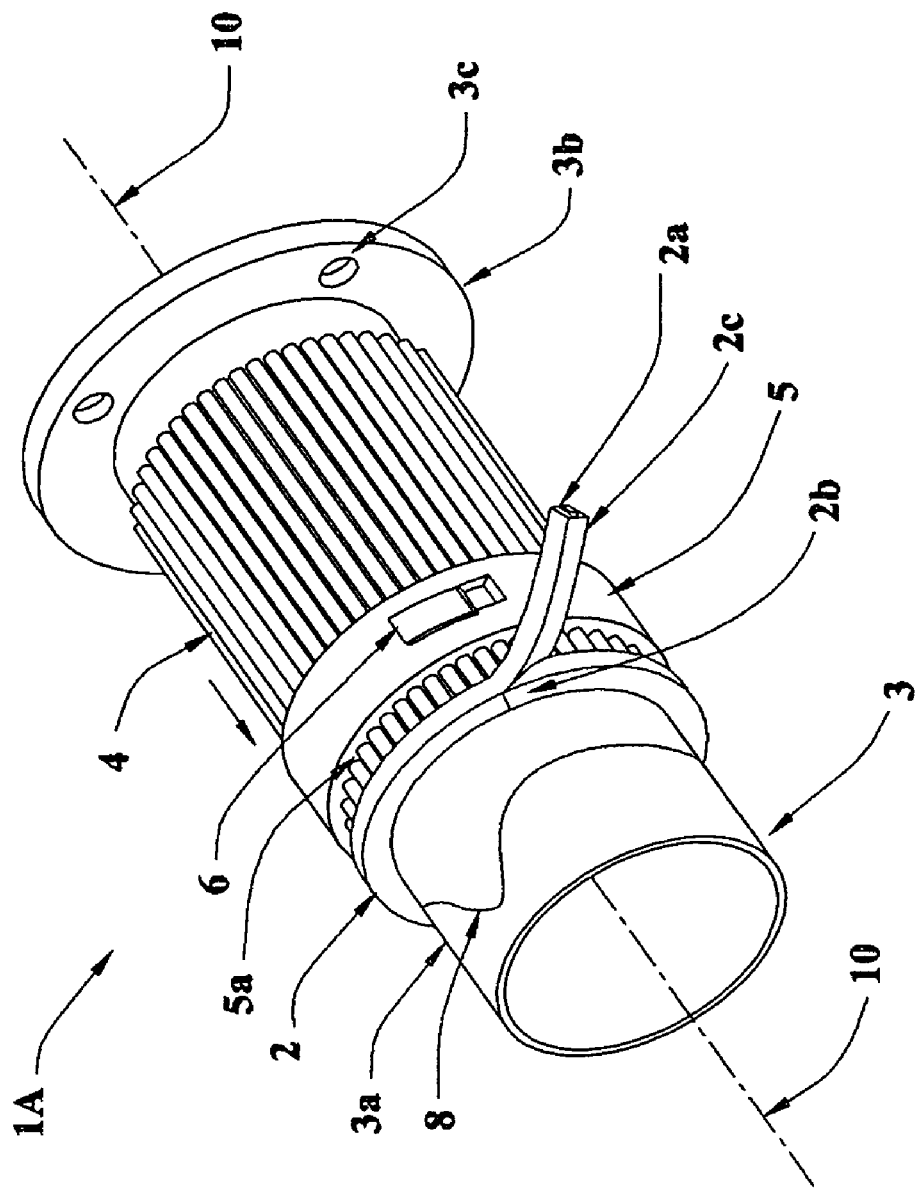
FIG. 9 shows an isometric view of the universal template 1A after the track template is fully marked onto the surface of the cylindrical stationary sleeve.
Figure 10:
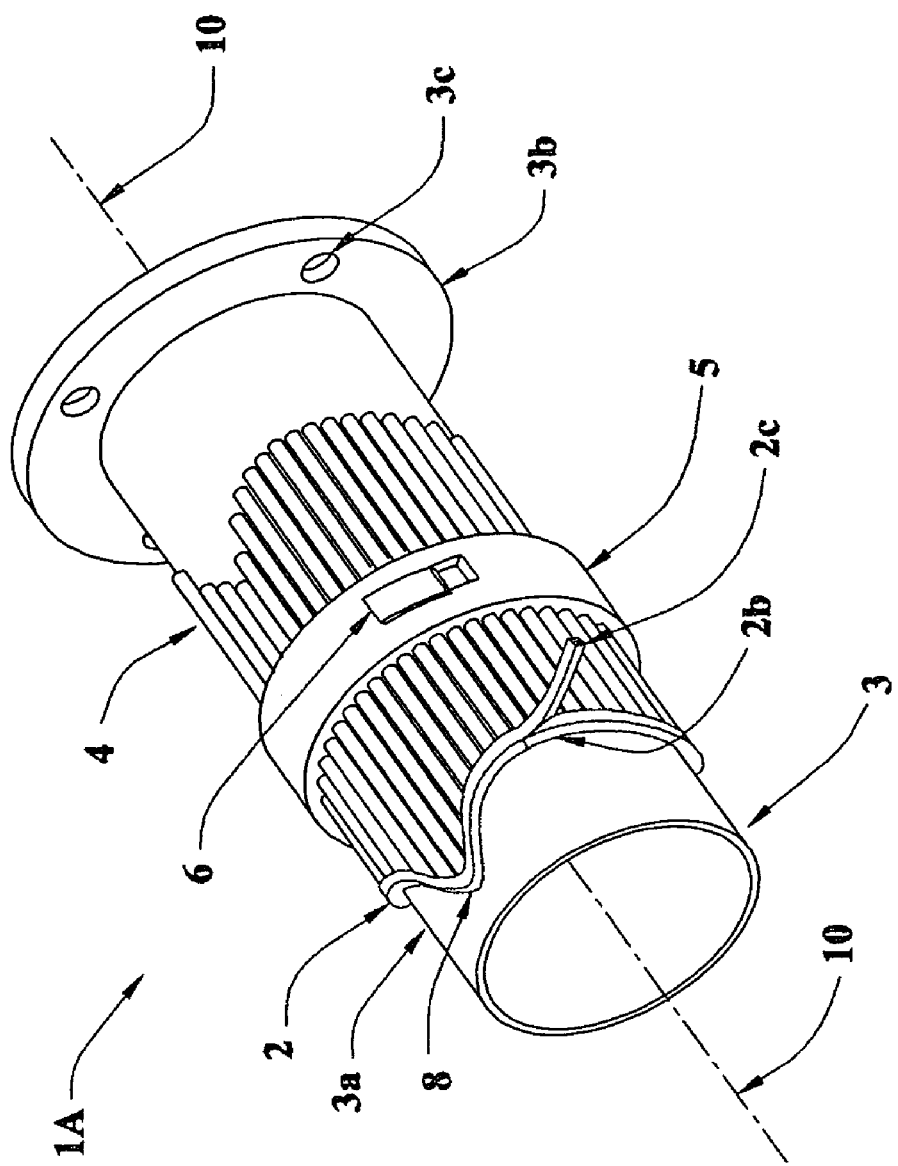
FIG. 10 shows an isometric view of the universal template 1A in FIG. 9 after the flexible track is formed to take the shape of the track template 8 marked onto the surface of the cylindrical stationary sleeve.
Figure 11:
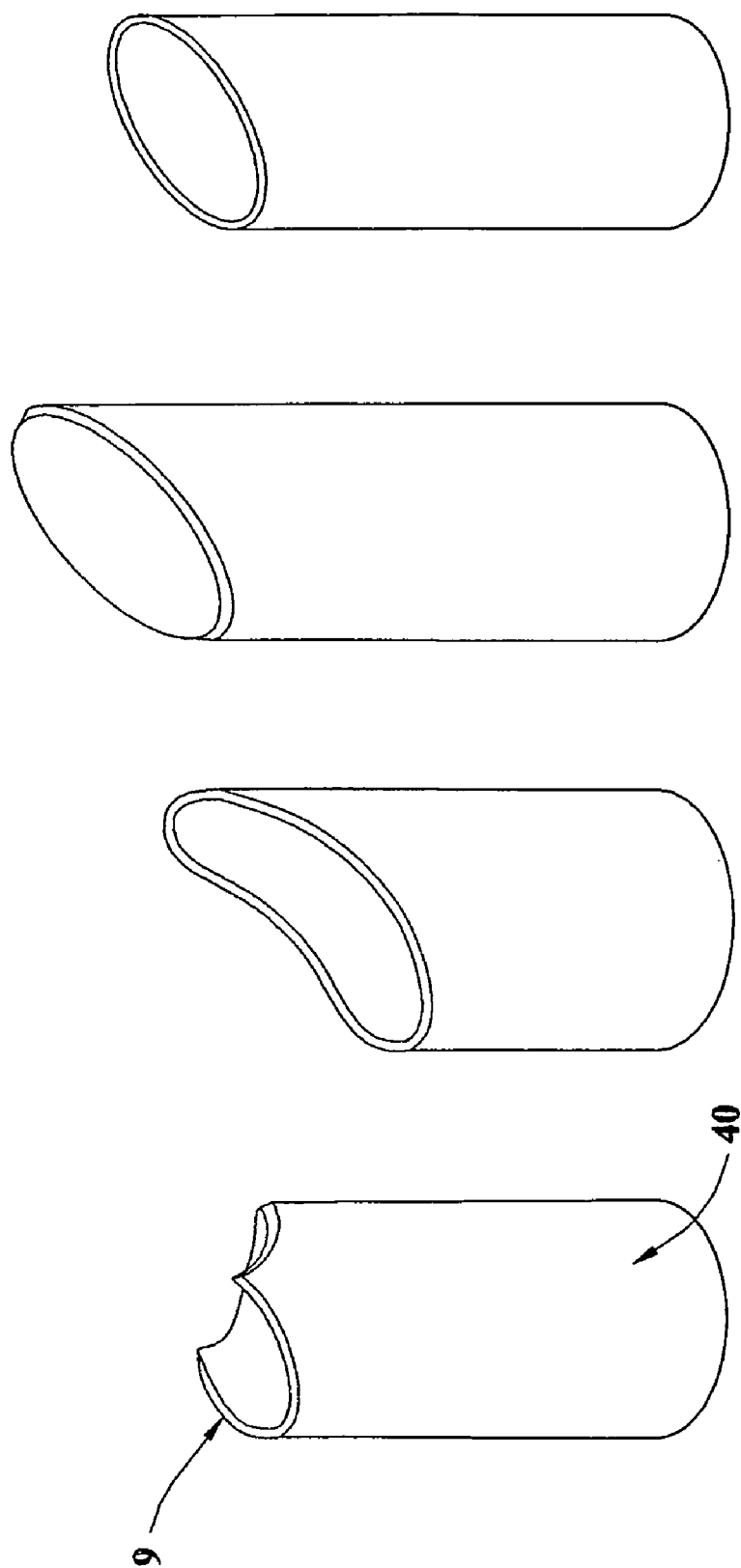
FIG. 11 shows an isometric view that illustrates some of the shape-cutting capabilities of the proposed invention.
Figure 12:
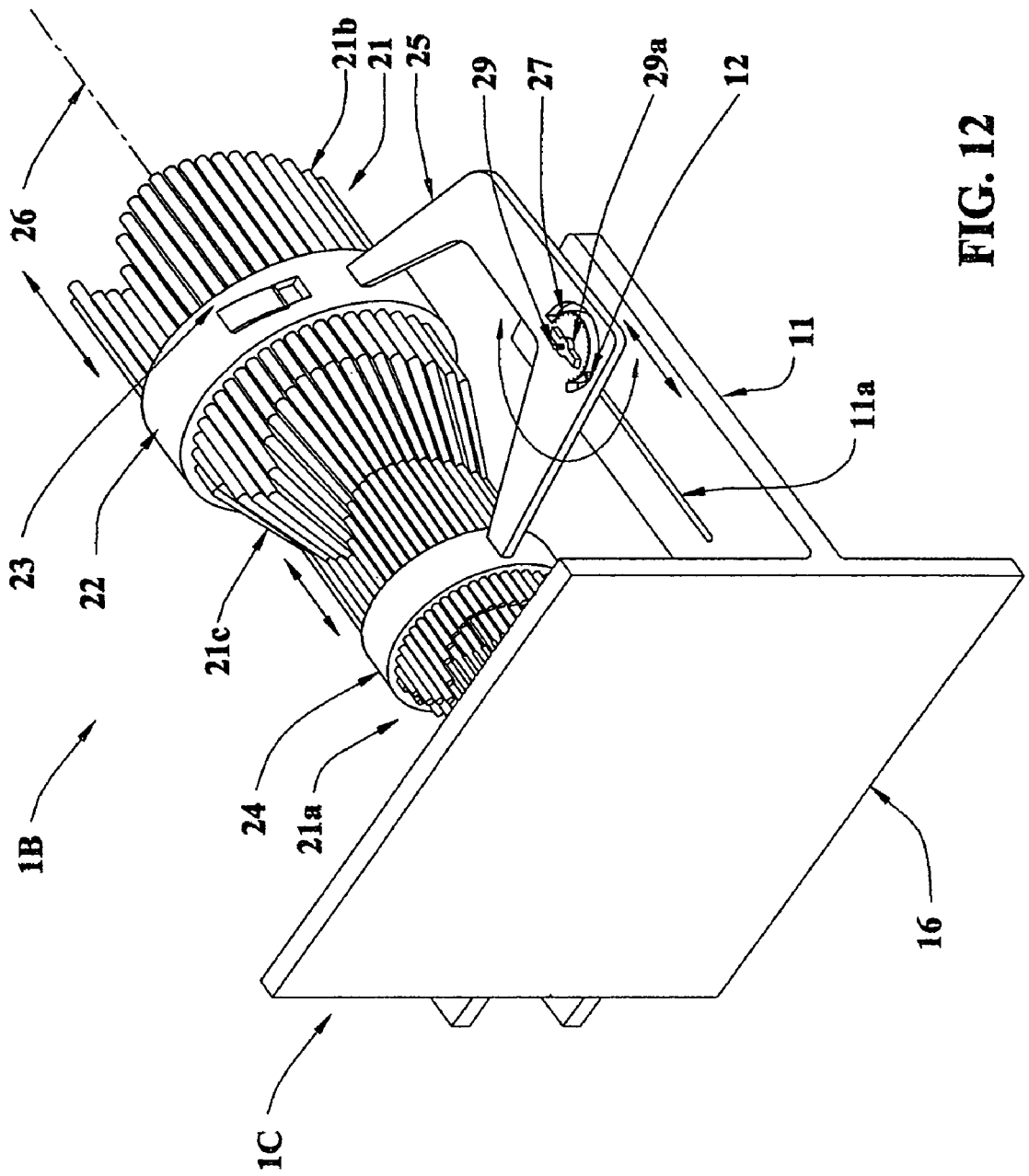
FIG. 12 shows an isometric view of the template adapter 1B attached to the miter table 1C showing possible relative motion and rotation.
Figure 13:
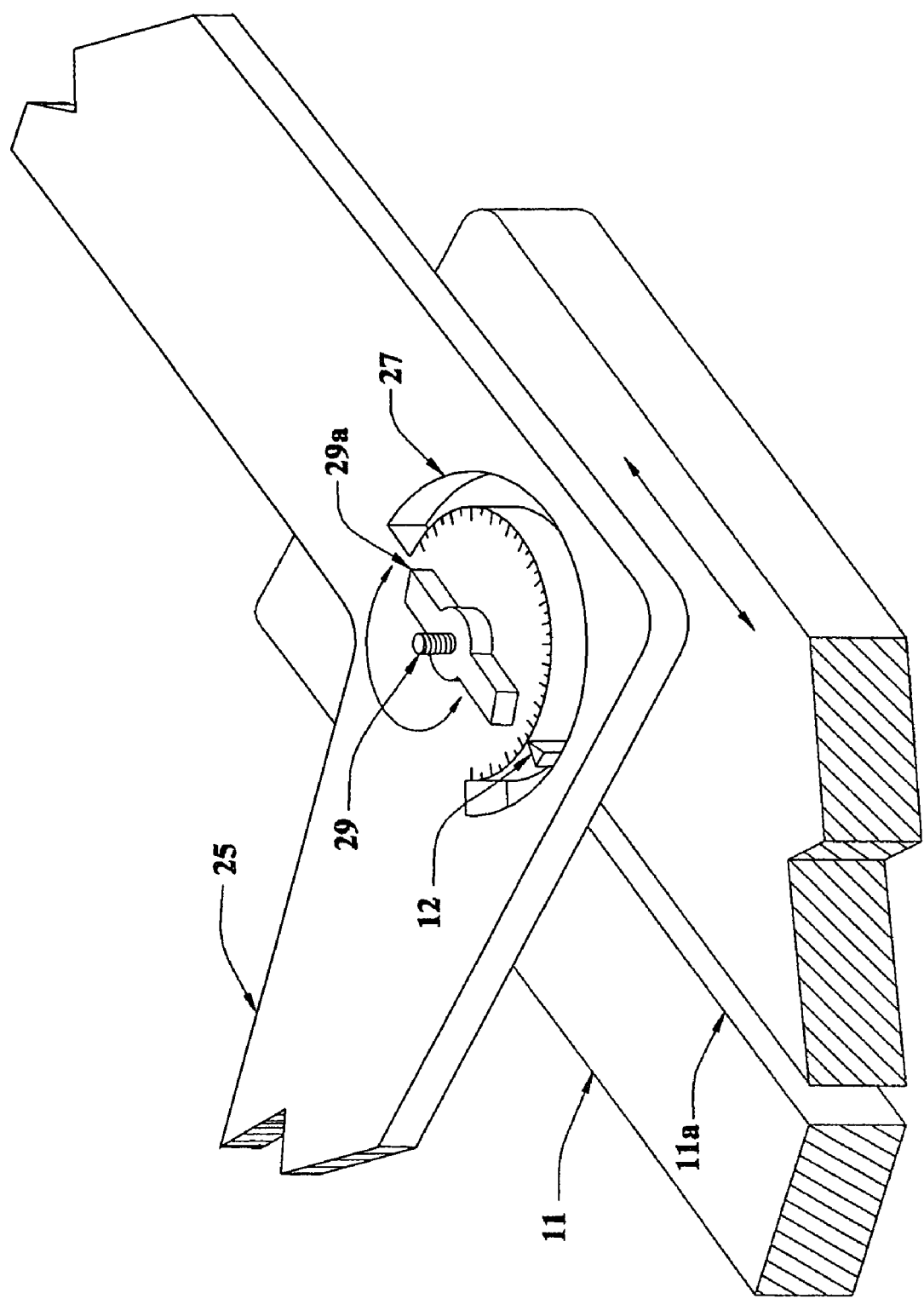
FIG. 13 shows an enlarged view of the rigid handle 25 of a template adapter 1B connected to the column 11 of a miter table 1C and the possible relative motion and rotation. The angle indicator 12 reading miter or connection angles at the C-shaped protractor window 27.
Figure 14:
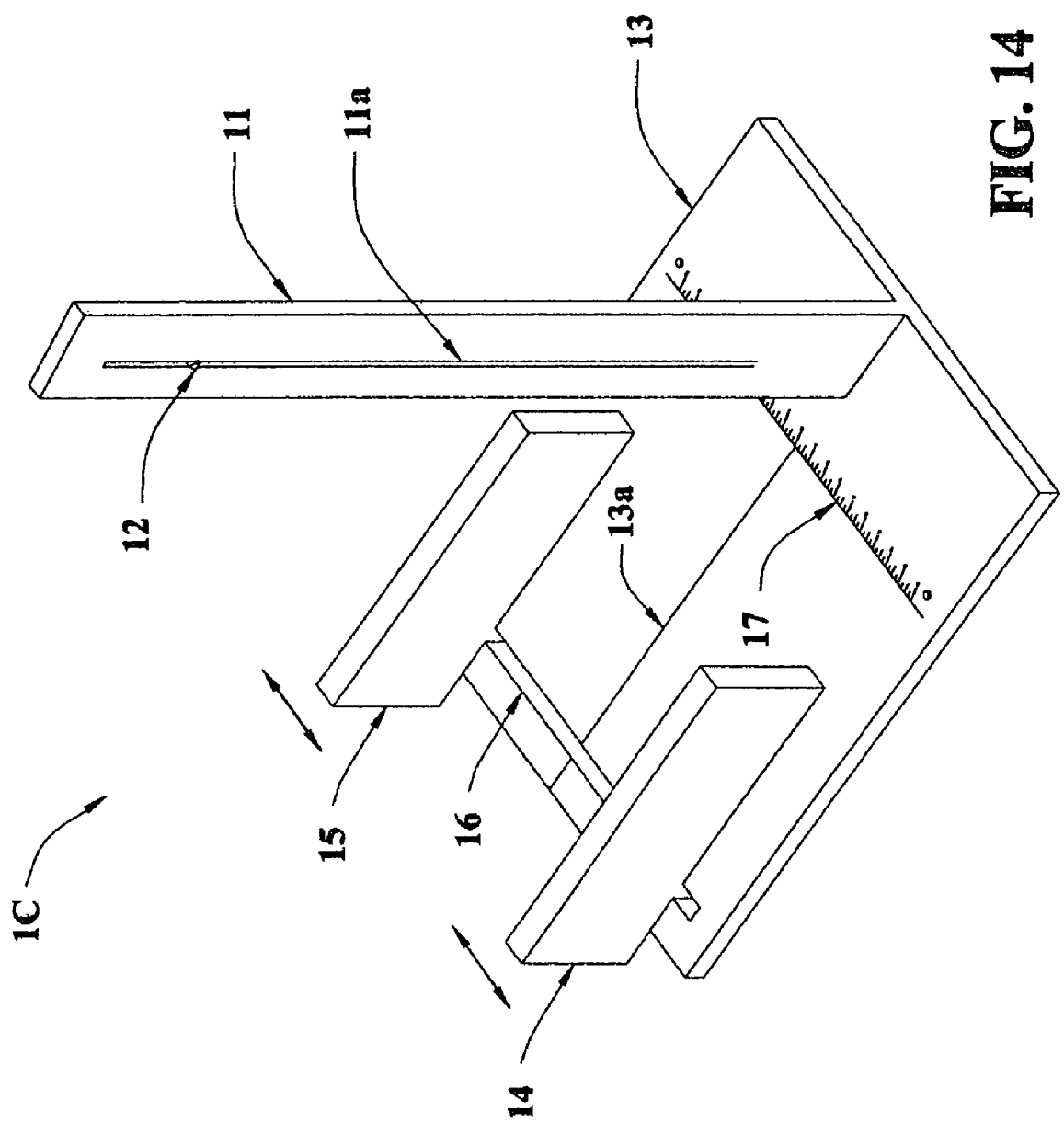
FIG. 14 shows an isometric view of the miter table 1C with directions of possible movements of the guides.
Figure 19:
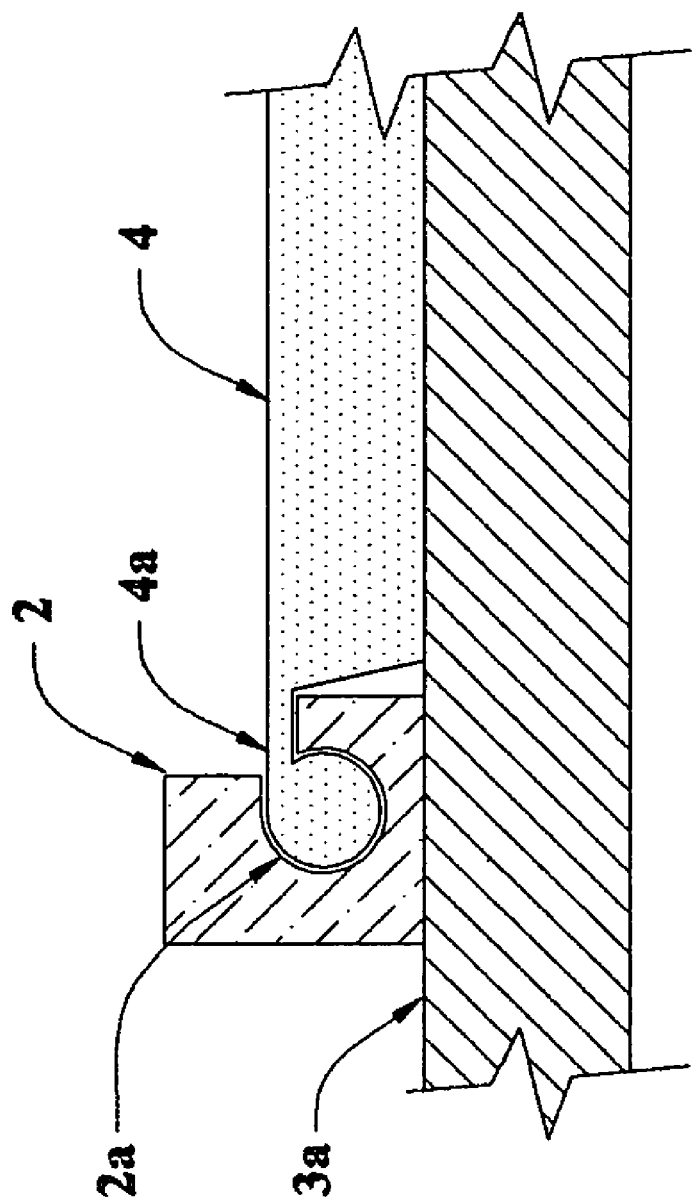
FIG. 19 shows a partial sectional view of the flexible track 2 as it interconnects to the end 4*a* of a sliding pin 4 inside the longitudinal slotted groove 2*a* of the flexible track 2, adjacent cylindrical stationary sleeve 3.
Figure 20:
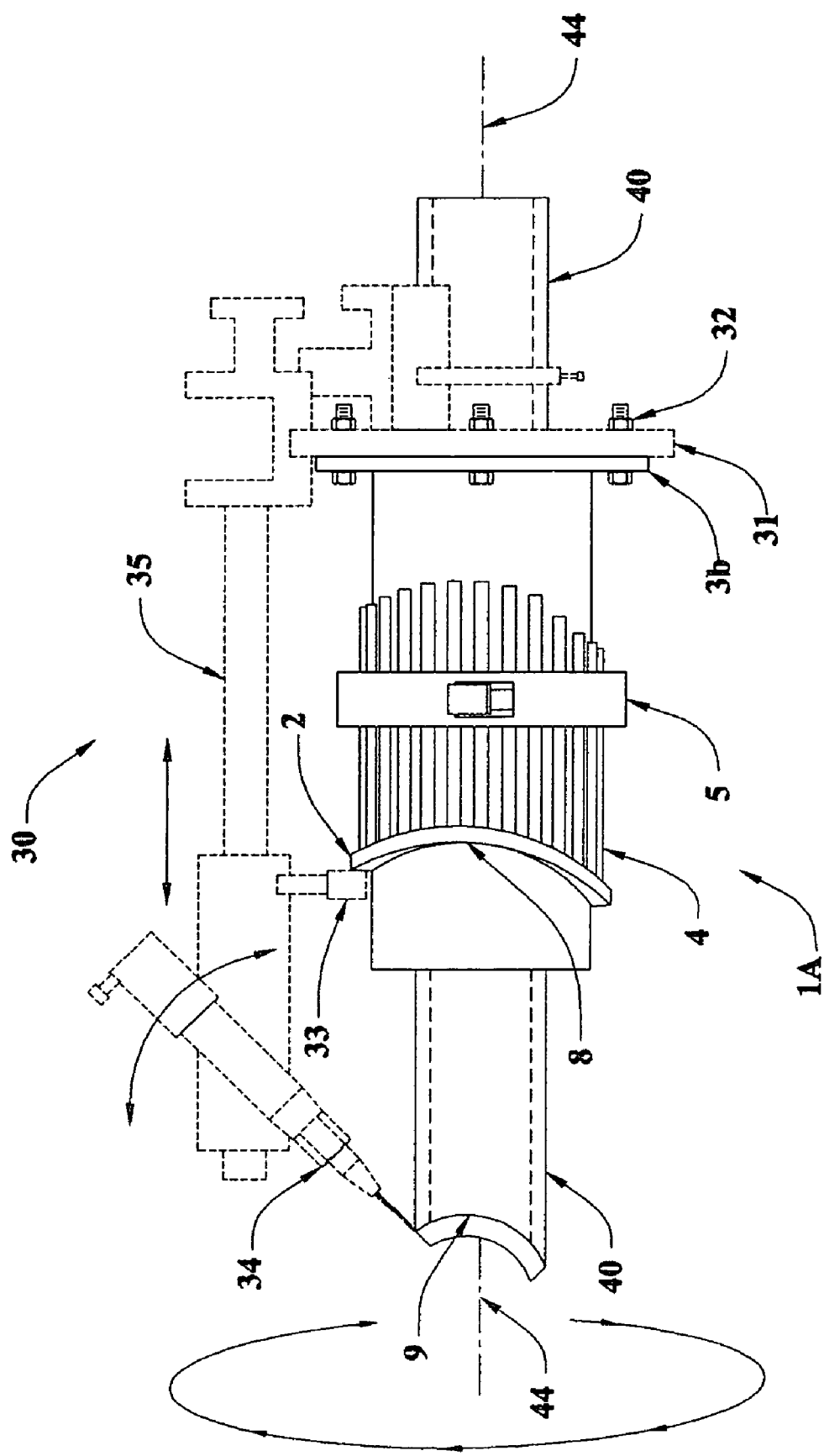
FIG. 20 shows a side view of the universal template 1A in use with a pipe-beveling machine 30.
Figure 21:
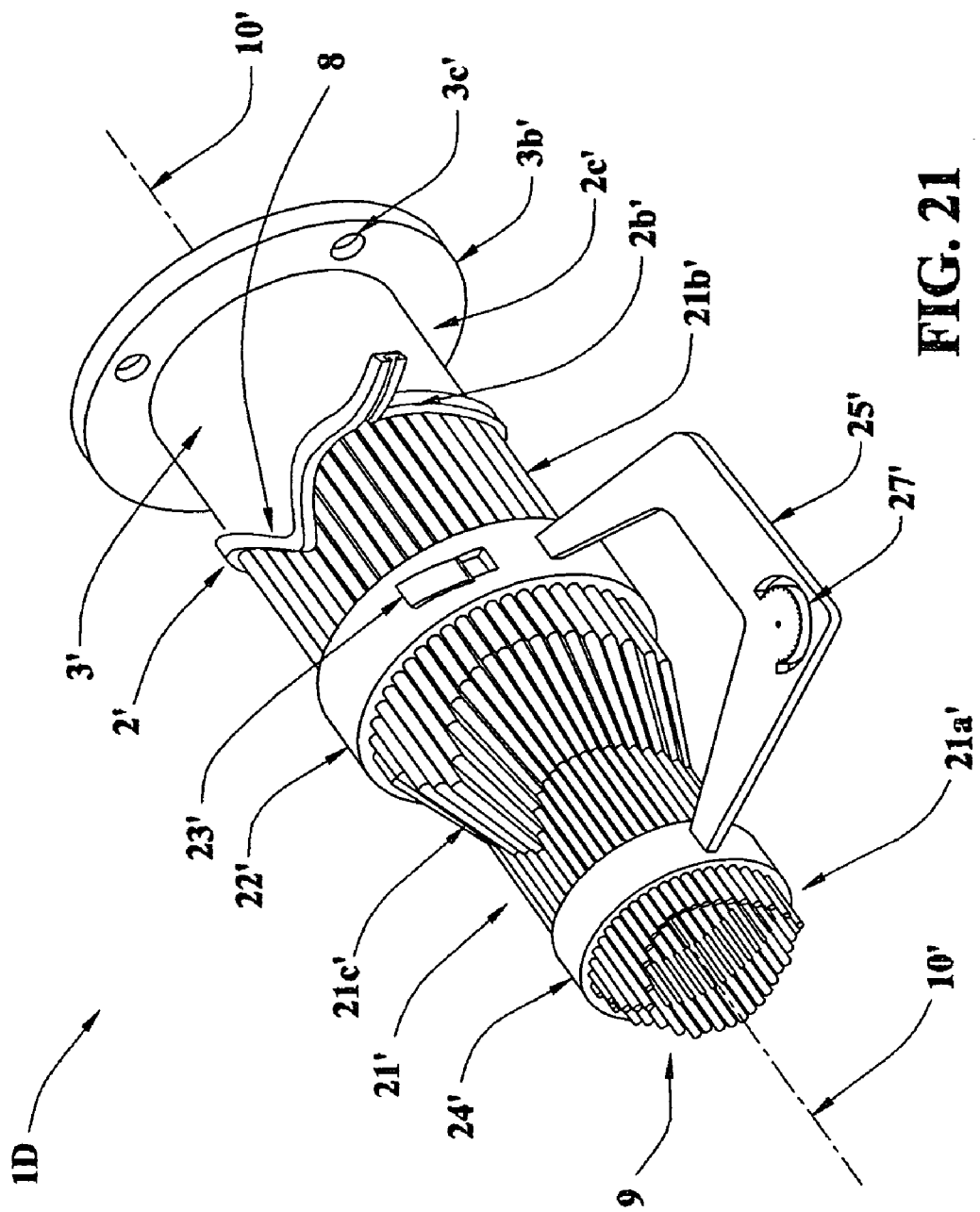
FIG. 21 shows an isometric view of an alternative embodiment of the universal template 1D.
Figure 22:
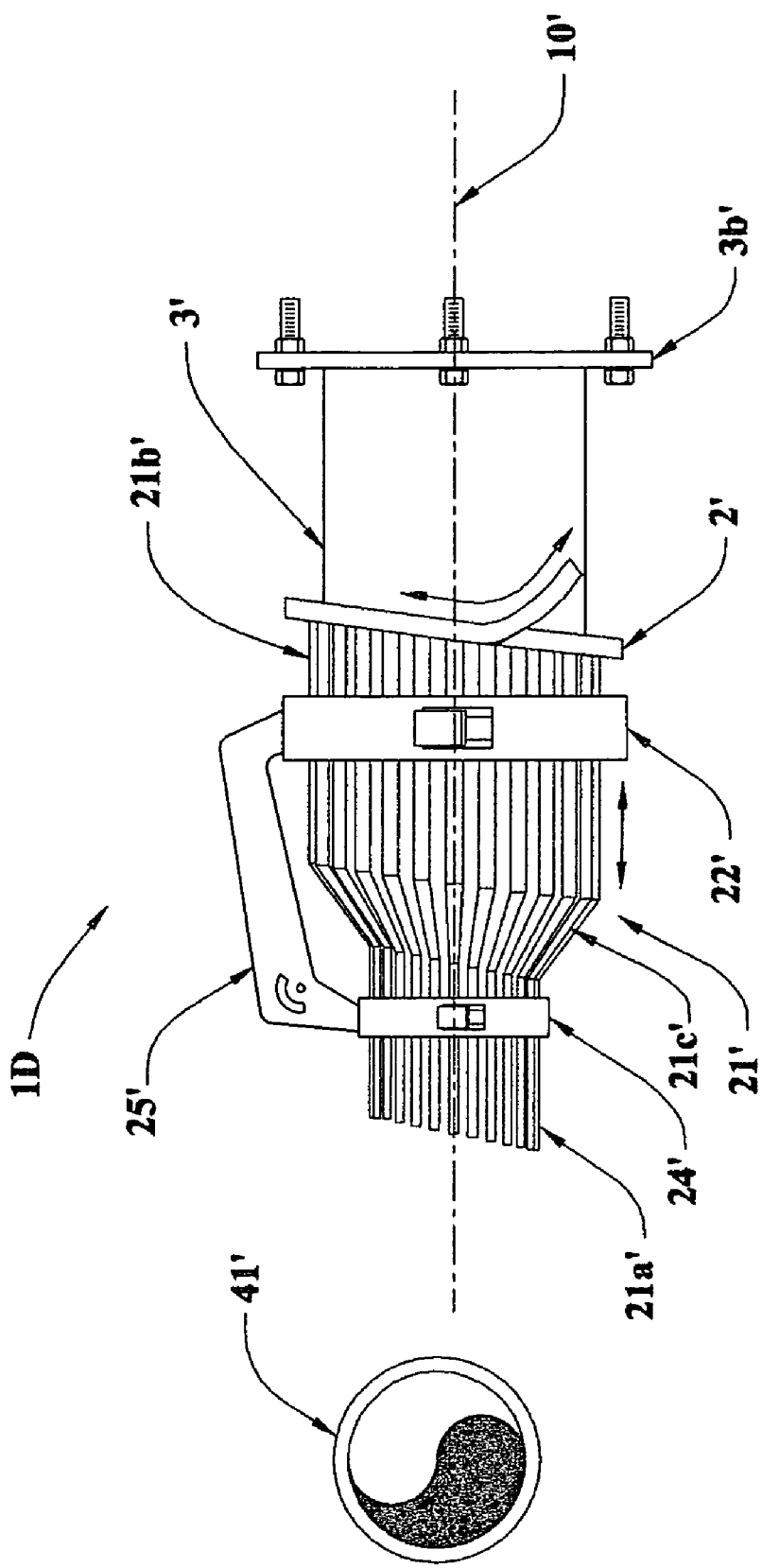
FIG. 22 shows a side view of the universal template 1D with the track on the end of the pins.
Figure 23:
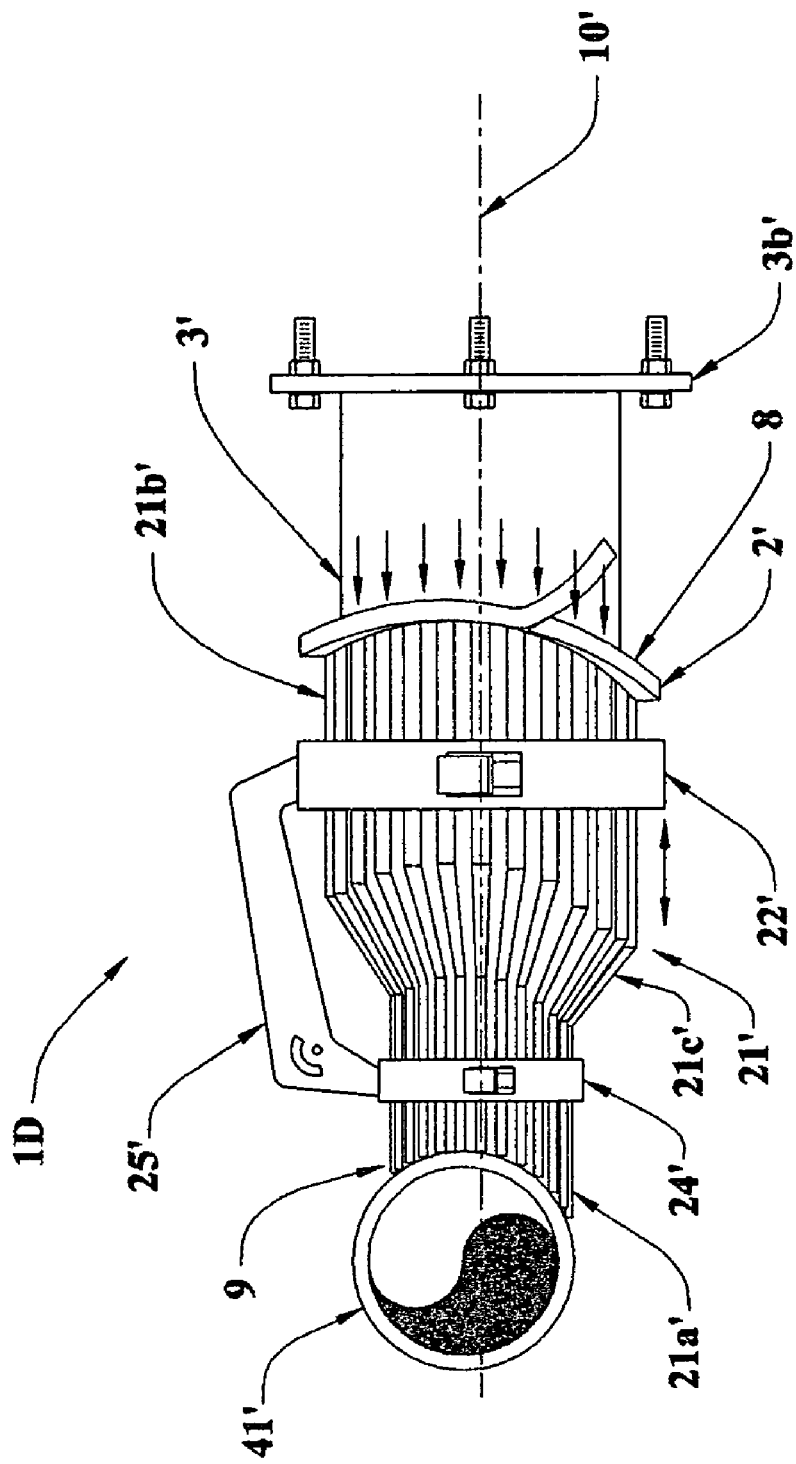
FIG. 23 shows a side view of the universal template 1D with the pins of the universal template engaging a pipe to obtain a contour for the track.
Figure 24:
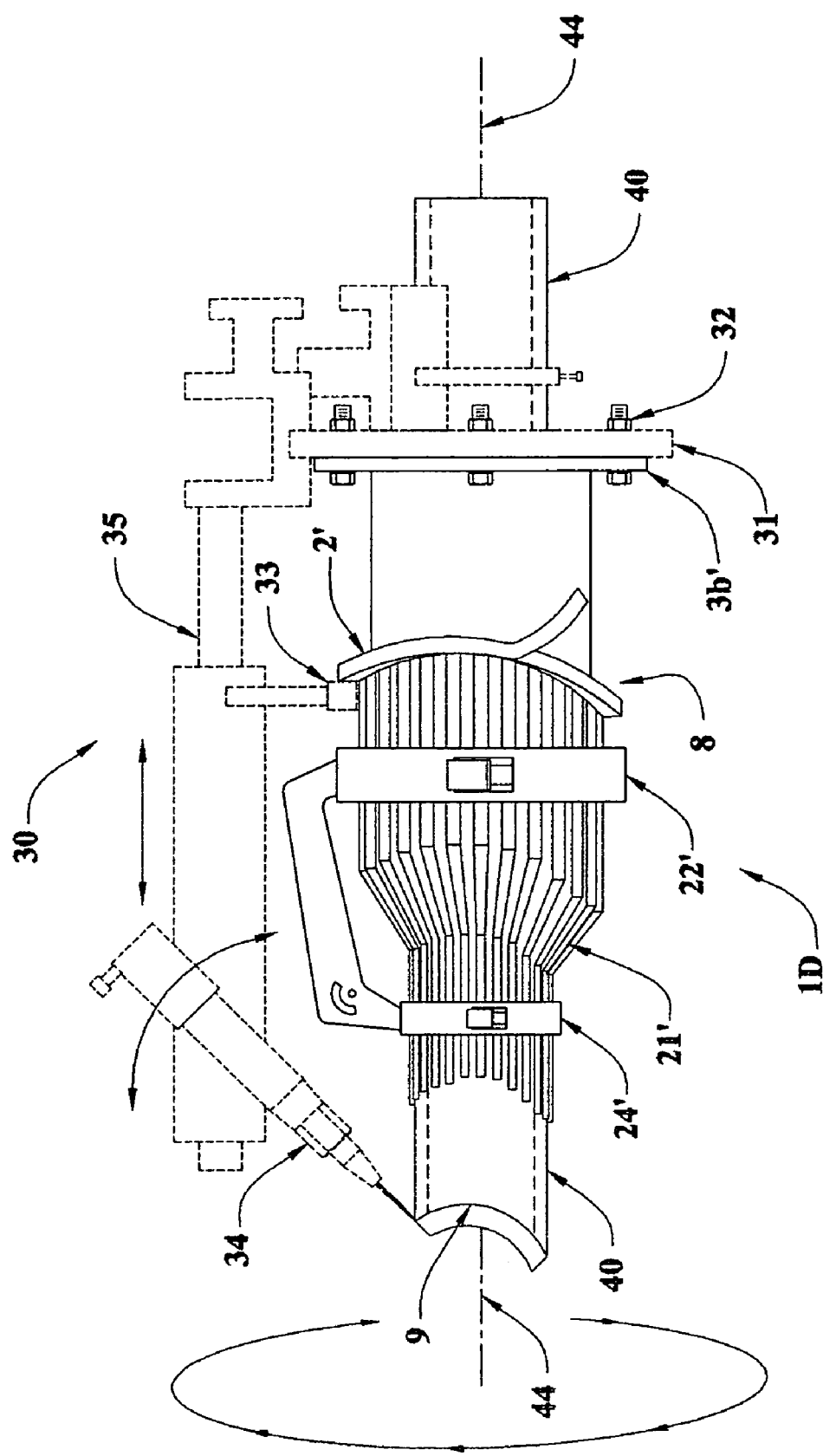
FIG. 24 shows a side view of the universal template 1D with the track on the end of the pins engaging a beveling machine.

The present invention relates to an accurate easy to use, and a cost-effective system for pipe end universal shape cutting, beveling and welding. The universal template 1 can be used with a short saddle pipe-beveling machine 30 as in FIG. 20. The universal template 1 can also work with a band-type cutting and beveling machine, if the machine is equipped with a face or bolting brackets. Such machines are well known and are generally available in the market. The main function of this apparatus is to allow a cutting torch 34 of a pipe saddle machine 30 to follow the path of the flexible track 2 while the machine rotates around the pipe 40, cutting and beveling a pipe end for a desired smooth shape cut. The use of a flexible track, in a beveling machine, yields accurate smooth cutting and uniform beveling. The universal template 1, used with a pipe-beveling machine, provides a method for automation and repetitive application of pipe shape cutting. The flexible track 2 of the universal template 1A, 1D, 1E, 1F, 1G can also be used for welding, marking, cutting or other functions. The flexible track 2, 2' and 2" of the universal template 1A, 1D, 1E, 1F, 1G is formed around the outer surface of a cylindrical stationary sleeve 3 to act as a three-dimensional template. After the flexible track 2, 2', 2" is formed to take the shape of the desired track template 8, a securing mechanism is used to hold the pins in place. Such securing mechanisms are well known in the art. The securing mechanism comprises a full array of parallel sliding pins 4 that slide independently along the surface of the cylindrical stationary sleeve 3 and through an array of guides 5a. The guides 5a are built in a secondary sleeve referred to as the pin sleeve 5. As shown in FIGS. 2 and 19 the flexible track 2 has the flexibility to bend in two perpendicular planes (flexible rulers used in two-dimensional manual drafting can bend in one plane only). The flexible track 2 is made of flexible plastic or rubber (or other similar material) and has a longitudinal slotted groove 2a, where the ends of the sliding pins 4a are attached. As the length of the track template 8 varies from one template to another, the slotted groove 2a allows the flexible track 2 to slide along the ends of the sliding pins 4a, making the length in use of the track adjustable. Small rollers may be installed at each pin end, or lubricants used, to allow for smooth track length adjustment. One end of the flexible track 2 is fixed to one of the sliding pins 4, while the other end will be free allowing for adjustability of the track length in-use. As shown in FIG. 2 the fixed end 2b of the flexible track 2 is tapered to create a smooth joint as it closes the loop with the free end 2c of the flexible track 2.

The cylindrical stationary sleeve 3 includes a hollow pipe 3a. The cylindrical stationary sleeve 3 is equipped with a flange 3b at one end. The flange 3b allows the universal template 1A to be mounted to the face 31 of a beveling machine 30 or other machines such as a welder or other cutting machines. The flange 3b is designed to have the same bolt hole pattern of the face 31 of a beveling machine 30 or to provide for means of attachment to the face 31 of a beveling machine 30, or other types of machines.

As shown in FIG. 19 the sliding pins 4 are attached at one end to the flexible track 2 and can be secured in place using a locking mechanism 6, built into the pin sleeve 5. Ends of the sliding pins 4a are shaped to fit inside and slide through the slotted groove 2a of the flexible track 2. The locking mechanism 6 employs a friction strap wrapped around the said pins. The friction strap is tightened or loosened, locking or releasing the pins 4 in place as needed.

As an alternative to using the sliding pins 4, the said locking mechanism may consist of a series of electrical magnets arranged along the flexible track 2 and activated to secure the flexible track 2 in place, while the said track is formed around the outer surface of the cylindrical stationary sleeve 3.

The pin sleeve 5 has a ring shape and is placed around to the cylindrical stationary sleeve 3. Several standard track templates 7 for different shape and miter cuts can be marked (or engraved) onto the outer surface of the cylindrical stationary sleeve 3. Each engraved template is given a designated name or code 7a. Standard template marks 7 can be color-coded in order to be distinguished. A user guide is used to illustrate standard connections or miters corresponding to engraved codes.

In one embodiment the process of using the universal template 1A for beveled shape-cutting of a pipe end includes the following steps:

(A. 1) Attach the universal template 1 at the flange 3b to the face 31 of a beveling machine 30 using a set of bolts 32 or the like.

(A.2) Slightly tighten the locking mechanism 6 to allow for forced-only sliding of the sliding pins 4.

(A.3) Form the flexible track, around the cylindrical stationary sleeve 3 by aligning the outer edge of the track with the desired engraved template mark 7, or a desired track template 8 marked on the stationary sleeve 3. Visually insure that perfect alignment of the track and the template is achieved.

(A.4) Once the alignment is achieved, firmly tighten the locking mechanism 7 to secure the flexible track in place.

(A.5) Engage the torch roller 33 of a short saddle machine 20 with the outer edge of the flexible track 2.

(A.6) With the torch 34 ignited, and beveling angle adjusted, rotate the torch arm mechanism 35 using manual or mechanical devices.

(A.7) As the torch arm mechanism 35 rotates, the spring tension exerted on the torch roller 33 causes the roller 33 to follow the shaped edge of the flexible track 2, cutting and beveling the pipe 40 (work piece) to the desired shape. The locking mechanism 7 prevents the pins and the track from moving under the spring tension exerted on the torch roller 33.

In order to cut a pipe end to the shape of a connection template 9, the cutting torch needs to follow the corresponding track template 8. The diameter of the track template 8 falls within the reach of torch roller 33 and is usually greater than the diameter of the pipe 40 (work piece), that falls within the pipe diameter range of the beveling machine 30. The diameter of the track template 8 equals the diameter of the cylindrical stationary sleeve 3. In machines the track template requires having a diameter that is greater than that of the pipe being prepared. Thus, the unfolded shape of the track template 8 is derived from the unfolded shape of the pipe connection template 9 resulting from the geometry of intersection of the pipe 40 with a receiving component 41 such as another pipe or a large shell.

Another aspect of this invention relates to a tool and a direct method for generating the track template 8 required for facilitating contoured cuts using a beveling machine. The template adapter 1B, precisely generates track templates in a simple and direct manner that requires minimal skills. The template adapter 1B eliminates the need for using descriptive geometry methods used in prior art to derive guide templates. The template adapter 1B is made of a full array of Z-shaped pins 21 arranged radially to form the shape of a stepped cylinder. One side of the adapter 21a has a diameter approximately equal to the outer diameter of the pipe 40. The other side 21b has a diameter approximately equal to the stationary pipe sleeve 3 of the universal template 1. An angled portion 21c connects the two diameters 21a and 21b. The Z-shaped pins 21 slide independently through two adapter sleeves 22, 24 forming the shape of a stepped cylinder. The said sleeves 22, 24 are parallel to each other and have a common centerline 26. The first sleeve is located at the wide side 21b and is referred to as the adapter wide sleeve 22. The second sleeve is located at the narrow side 21a and is referred to as the adapter narrow sleeve 24. The pins 21 are received by two arrays of guides 22a, 24a. The guides are radially arranged and built in the adapter sleeves 22, 24. The guides 22a allow the pins 21 to slide longitudinally and restrain pins from rotation. The guides keep pins 21 parallel and maintain the shape of the stepped cylinder. One or at least one (or both) of the adapter wide sleeve 22 or the adapter narrow sleeve 24 is equipped with a locking mechanism 23 to lock the pins 21 in place when needed. The locking mechanism 23 employs a friction strap, wrapped around the pins 21. The friction strap is tightened or loosened, locking or releasing the pins 21 in place as needed. The main objective of the template adapter 1B is to record the connection template 9 (at the narrow end) and simultaneously generate the corresponding track template 8 (at the wide end). The track template is then transferred onto the universal template 1 and used for shape cutting.

The relative position of both adapter sleeves 22, 24 is maintained by a rigid handle 25. The U-shaped handle is fixed to both sleeves. The rigid handle 25 ensures that the Z-shaped pins 21 are always parallel to each other and to the adapter centerline 26.

Figure 18:
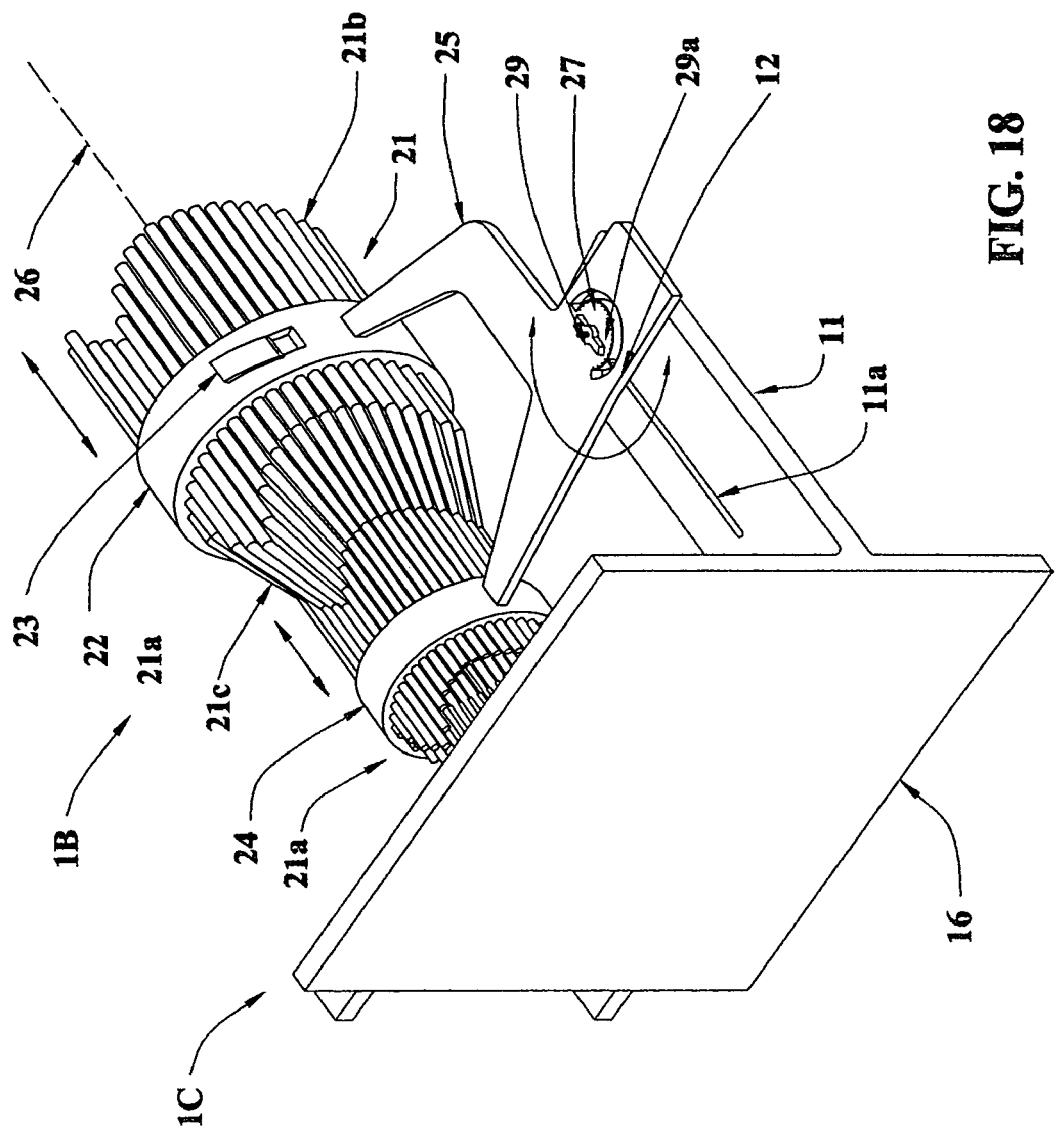
FIG. 18 shows an isometric view of the template adapter 1B attached to the miter table 1C with an alternative design of the rigid handle that allows for wide rotation of the template adapter 1B to record sharp miter angles without interference with the column of the miter table 1C.

The rigid handle 25 has a circular pivot hole 28. The pivot hole receives a threaded pin 29 with its matching wing nut 29a. As shown in FIG. 18 the function of the pivot hole 28 and the pin 29 is to attach the template adapter 1B to the miter table 1C. The rigid handle 25 has a C-shaped window with protractor gradations 27a engraved around the said window 27. The C-shaped window is circular, and its center coincides with the center of pivot hole 28.

The method of the template adapter 1B includes forming the narrow side 21a of the adapter to take the shape of the pipe connection template 9. As pins 21 slide along the adapter sleeve 22, the corresponding track template 8 is simultaneously generated at the wide side 21b. One way to carry out this process is to push the pins 21 to allow the narrow side 21a of the adapter to contact the surface of the receiving component 41, which will be joined to the work piece 40. The said process is carried out while both the adapter and the receiving component are at the desired predetermined relative orientation. As the narrow side 21a of the adapter records the connection template 9, the corresponding track template 8 is simultaneously generated at the wide side 21b. Another way is to use readily available and widely used paper templates in the following manner shown in FIGS. 5–10:

(a) A paper template 42 is wrapped around the work piece 40, and a template adapter 1B is slipped over the work piece 40.

(b) Then, the pins at the narrow side 21a are aligned with the template contour 42a, causing the wide side 21b to take the shape of the desired track template 8. The template is marked.

(c) After the track template 8 is generated, the template adapter 1B is slipped over the stationary pipe sleeve 3 adjacent the universal template 1A. The template and pins on the universal template are adjusted to match the pins on the track template and the track is then used with a beveling machine for cutting the work piece.

The direct process of obtaining and transferring the track template 8 includes the following steps:

(B. 1) Slip the template adapter 1B over the pipe 40.

(B. 2) Position the pipe 40 at the proper orientation relative to the receiving component 41, which the pipe 40 will be joined to.

(B. 3) As an alternative, the two previous steps can be replaced by positioning the template adapter 1B at the proper predetermined orientation with respect to the receiving component 41.

(B. 4) Push the template adapter 1B against the surface of the receiving component 41 allowing the narrow side 21a of the adapter to take the shape of the pipe connection template 9 and the wide side 21b to take the shape of the desired track template 8.

(B. 5) Lock the pins 21 in place using the locking mechanism 23 and remove the template adapter 1B.

(B. 6) Slip the wide side 21b of the template adapter 1B over the cylindrical stationary sleeve 3 of the universal template 1A. Mark the track template 8 onto the surface of the cylindrical stationary sleeve 3. Use a marker 43 of which its marking is visible and also erasable, when applied onto the cylindrical stationary sleeve 3.

In order to cut, bevel or weld the pipe end, move the flexible track 2 to follow the marking on the cylindrical stationary sleeve, and then follow all the steps mentioned earlier in the sequence of using the universal template 1 for beveled shape cutting of a pipe end by following the contours of the track 2 with the machine.

The prior art, used in pipe connection layout, requires both connection components to be brought together and positioned at a predetermined orientation with respect to each other. That process requires both time and physical effort that involves moving, lifting, and building temporary fixtures. It also involves tedious measuring. The larger the diameter of the connecting components, the greater the amount of physical work involved.

The invention provides a quick and simple solution for facilitating both connection and track templates for fabricating pipe connections comprising acute angles or offsets or a combination of both.

This invention also pertains to an auxiliary layout tool referred to as the miter table 1C. The miter table 1C provides a quick method for creating the templates for pipe connections involving an offset between the centerline of the work piece and that of the receiving component. The miter table 1C also provides a fast and easy method for creating connection and track templates for pipe connections involving acute angles of intersection between the work piece and the receiving component. It also offers a precise method of generating the track template 8 for pipe connections involving miter cuts.

The miter table 1C as shown in FIGS. 1 and 12–16 consists of a long rigid column 11. The column 11 has a long slotted aperture 11a and an angle indicator 12 that slides along the long slotted aperture 11a, while maintaining its orientation. The column 11 is rigidly connected to a flat table 13 that has a perfectly flat top. The flat table 13 contains a long slotted groove referred to as the guide groove 16. The guide groove 16 enables two guides 14, 15 to slide independently along the guide groove 16 while maintaining faces of the guides 14, 15 perpendicular to flat top and the guide groove 16. An offset ruler 17 is marked or engraved onto the surface of the flat table 13.

An alternative design of the rigid handle 25 includes a longer distance between the column 11 and the adapter 1B, which allows the template adapter 1B to have a wider rotation range, allowing it to record templates for connections involving sharp acute angles without interference with the column 11 of the miter table 1C.

A set of curved plates 18 where the shape of each of the plates simulates the outer or inner surfaces of a partial pipe or a chunk of a large diameter shell may be used in conjunction with miter table 1C. Each of the curved plates 18 is labeled with a shell size tag 19 showing the nominal or actual diameter of the represented shell. The curved plates 18 are made of plastic or light metal and cover a wide range of pipe and large shell diameters. For example the set of curved plates may include the following plates:

(a) A curved plate 18a that simulates the outer surface of a standard 6" pipe.

(b) A curved plate 18b that resembles the inner surface of a standard 8" pipe.

(c) A curved plate 18c that resembles the inner surface of an extra heavy 10" pipe.

(d) A curved plate 18d that resembles a portion of a standard 2' pipe.

(e) A curved plate 18e that resembles a portion of a standard 6' shell.

(f) A curved plate 18f that resembles a portion of a standard 10' shell.

(g) Other curved plates that resembles various shapes and different sizes of receiving components.

The lightweight and the small size of the curved plates are of great convenience to the user as they minimize the physical effort involved in the template layout process.

Figure 15:
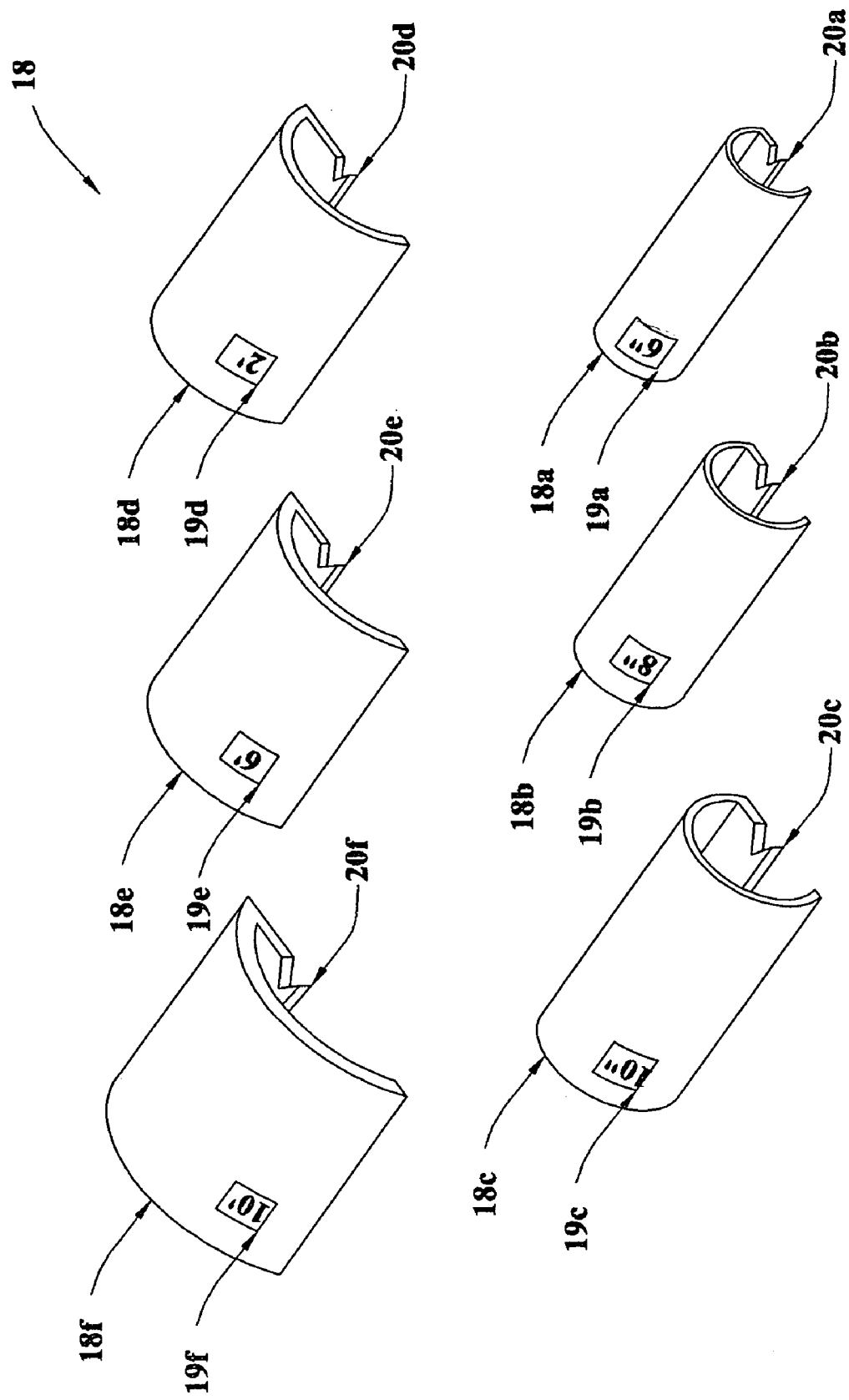
FIG. 15 shows a part of a set lightweight, flat bottom partial pipes or curved plates resembling the geometry of standard pipes and large diameter shells.
Figure 16:
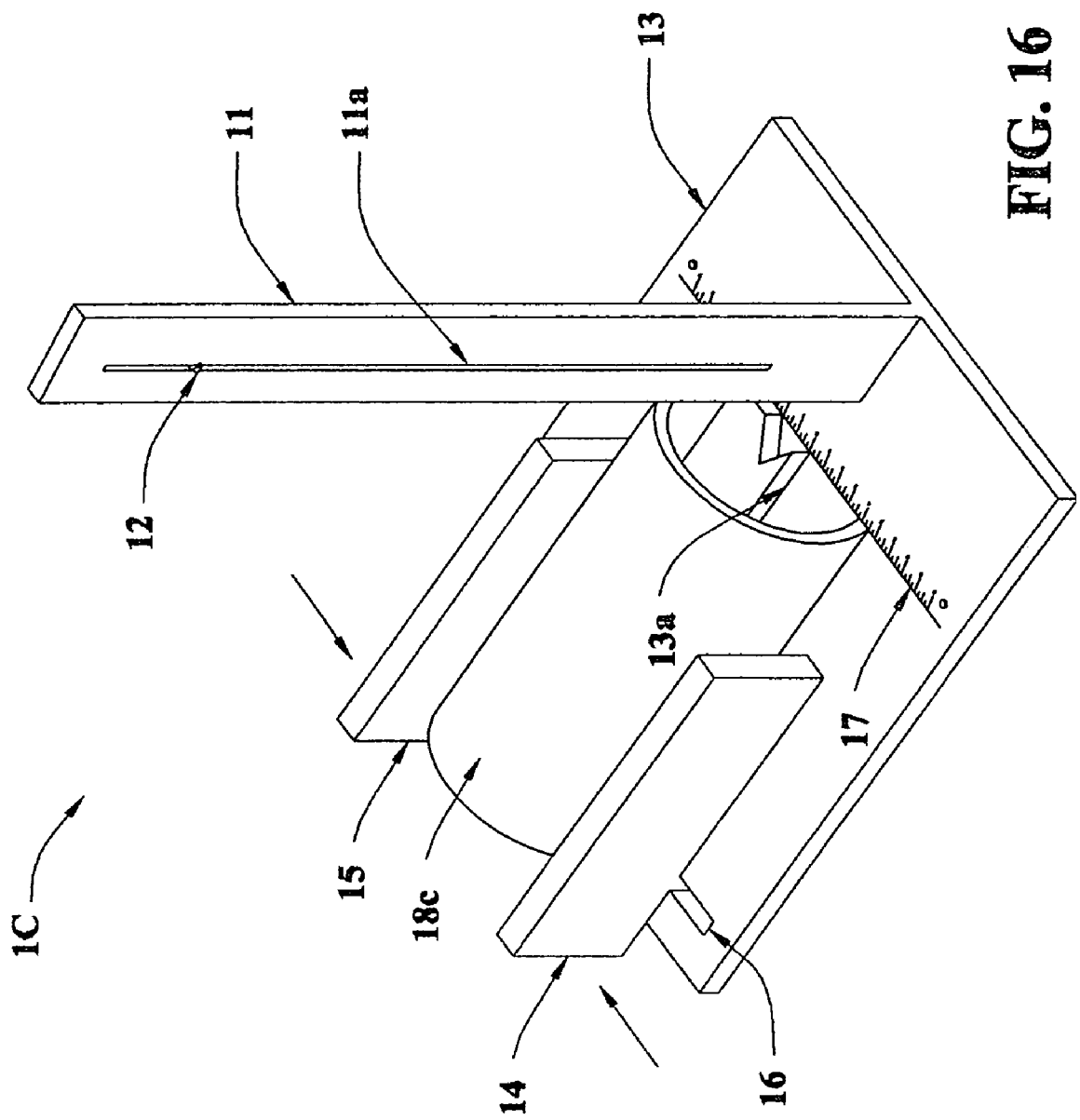
FIG. 16 shows an isometric view of the miter table 1C with a curved plate placed on the flat top of the table and positioned at a zero offset.
Figure 17:
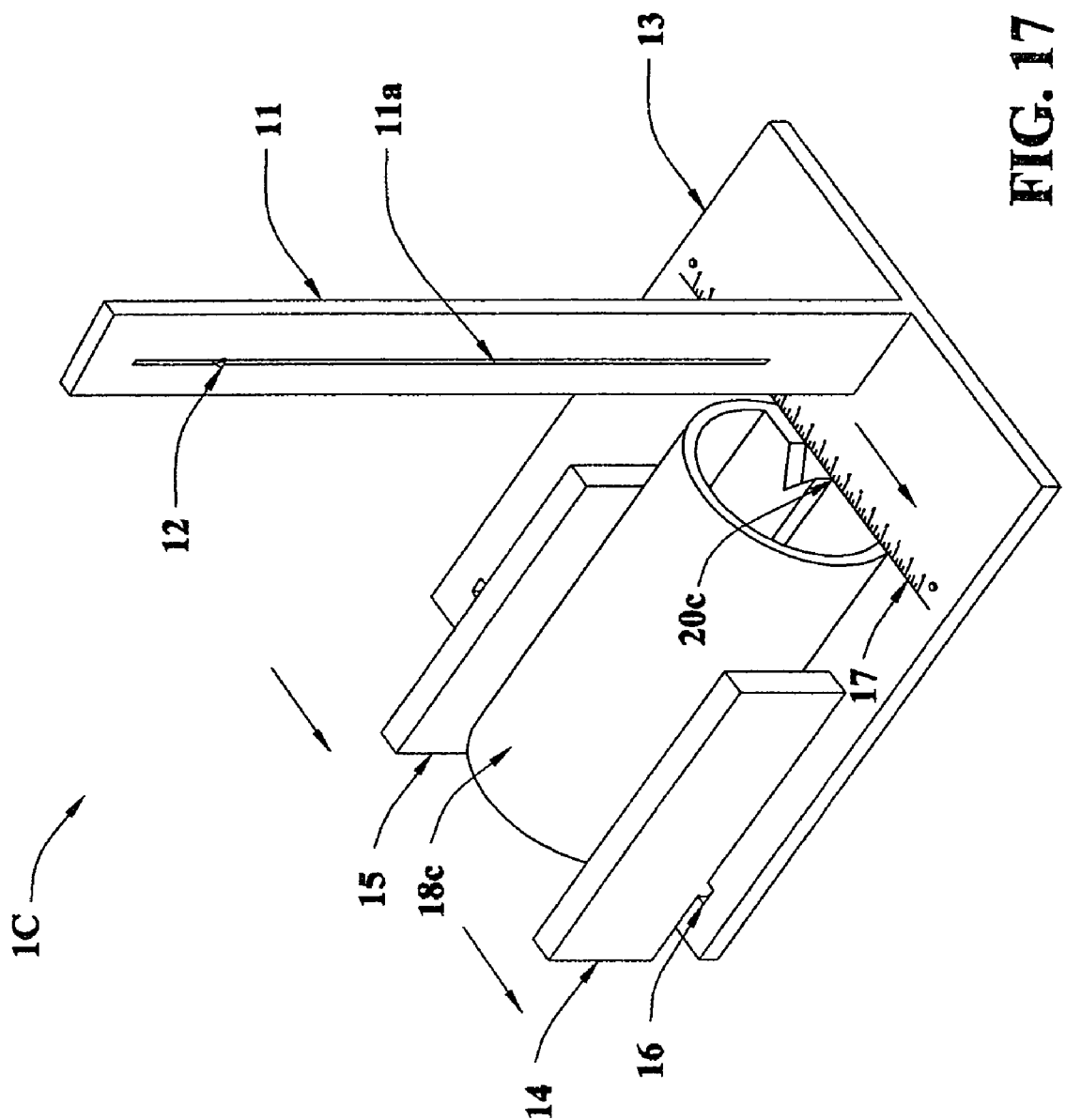
FIG. 17 shows an isometric view of the miter table 1C with a curved plate placed on the flat top of the table and the guides are moved so that the curved plate is positioned at a specific offset reading.

As shown in FIG. 15 size tags 18a, 19b, 19c, 19d, 19e, 19f are placed on or engraved onto the surface of each curved plate. Offset indicators 20a, 20b, 20c, 20d, 20e, 20f are placed at the centerline of each curved plate 18. Each curved plate 18 has a flat side that features an indicator, at its mid point. The flat side makes the curved plate stable if placed on the miter table or on top of any flat surface. The offset indicator 20 is placed against the offset ruler 17 to read the lateral offset between the curved plates 18c and the template adapter 1B. As one of the curved plates 18, representing a receiving component, is placed on the flat table 13, the guides 14, 15 are pushed against the two ends of the curved plates 18c to ensure proper alignment. The guides are also used to move the curved plates 18c laterally until the offset indicator 20 reads the desired offset at the offset ruler 17. The pin 29 and the wing nut 29a are used to attach the template adapter 1B to the miter table 1C through the pivot hole 28. As the template adapter 1B pivots around the pivot hole 28, its centerline 26 and the centermark 13a (engraved onto the flat table 13) will always fall in a zero offset plane that is perpendicular to the flat table 13.

The angle indicator 12 travels through the C-shaped protractor window 27 and reads the connection or miter angle at the protractor gradations 27a. Once the angle indicator 12 reads the desired connection angle, the wing nut 29a is tightened to secure the template adapter 1B in place, maintaining its orientation with respect to the flat table 13 (for miter cuts), or the curved plates 18c or the receiving component placed on top of the flat table 13. After the relative positioning is achieved, the user will push the pins of the template adapter 1B to contact the surface of the flat table 13 (for miter cuts), or the surface of curved plates 18c or the receiving component placed on top of the flat table 13. As a result, the narrow side 21a of the adapter records the shape of the pipe connection template 9 and the wide side 21*b* generates of the desired track template 8.

A sequence of using the miter table 1C with the template adapter 1B to obtain connection templates and track templates, utilized in the fabrication of pipe connections involving miter cuts and offsets, includes the following steps:

(C. 1) With the angle indicator 12 placed in the C-shaped protractor window 27, use the pin 29 and the wing nut 29*a* to connect the template adapter 1B to the miter table 1C through the Pivot hole 28. The template adapter 1B will pivot around the pivot hole 28.

(C. 2) Allow the angle indicator 12 to travel through the C-shaped protractor window 27 and read the connection or miter angle at the protractor gradations 27*a*. Once the angle indicator reads the desired miter or connection angle, the wing nut 29*a* is tightened to secure the template adapter 1B in place.

(C. 3) Place one of the curved plates 18*c*, representing the receiving component, onto the flat table 13. Push the guides 14, 15 against the two ends of the curved plate 18*c* to ensure proper alignment. As an alternative, a receiving component is placed on top of the flat table 13.

(C. 4) Move the guides 14, 15 holding the curved plate 18*c* or the receiving component, laterally until the offset indicator 20 reads the desired offset at the offset ruler 17.

(C. 5) Push the template adapter 1B to contact the surface of the flat table 13 (for miter cuts), or the surface of one of the curved plates 18, or the receiving component placed on top of the flat table 13, allowing the narrow side 21*a* of the adapter to record the shape of the pipe connection template 9 and the wide side 21*b* to generate the desired track template 8.

(C. 6) Lock the pins 21 in place using the locking mechanism 23 and remove the template adapter 1B.

(C. 7) Transfer the track template 8 onto the surface of the cylindrical stationary sleeve 3. Use a marker 34 that its marking is visible and erasable when used on the cylindrical stationary sleeve 3.

(C. 8) As an alternative to the previous step, Slip the wide side 21*b* of over the cylindrical stationary sleeve 3, then align the flexible track 2 to match the track template 8 at the wide side 21*b* of the template adapter 1B.

As before the machine for cutting, welding, or beveling will follow the track for a smooth cut or accurate and uniform weld so that the two pipes can be fitted together.

In an alternative embodiment as shown in FIGS. 21–24 the track 2 can be placed on the universal template 1D for a direct reading of the contour of the pipe being measured such that a machine can follow the track 2 without having an intermediate step of marking a trace on the sleeve 3 and following it with the track on the universal template. This eliminates one step in the process and provides for greater accuracy by eliminating errors introduced in the step.

Figure 25:
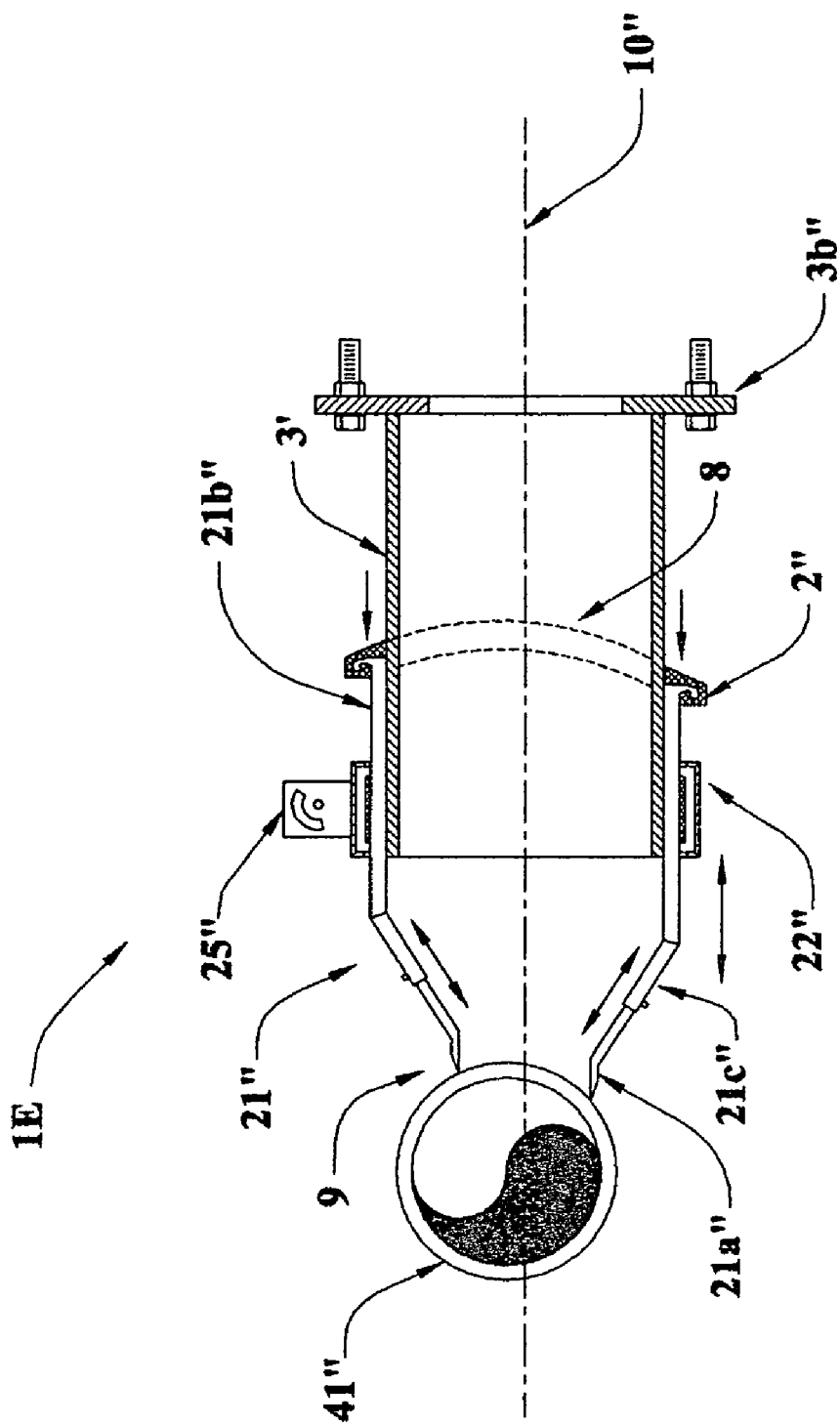
FIG. 25 shows a sectional side view of an alternative embodiment of the universal template 1E with adjustable segmented telescoping portions to adjust to several diameters of pipes.

In a second alternative embodiment as shown in FIG. 25 the universal template 1E the pins 21" have a telescoping angled portion 21*c*" and a straight portion of a first diameter 21*b*". The ends of the telescoping portion 21*c* touch the receiving component 41" to form a track template 8. In this embodiment their is only one pin sleeve 22" and the handle 25" for the miter is attached thereto.

Figure 26:
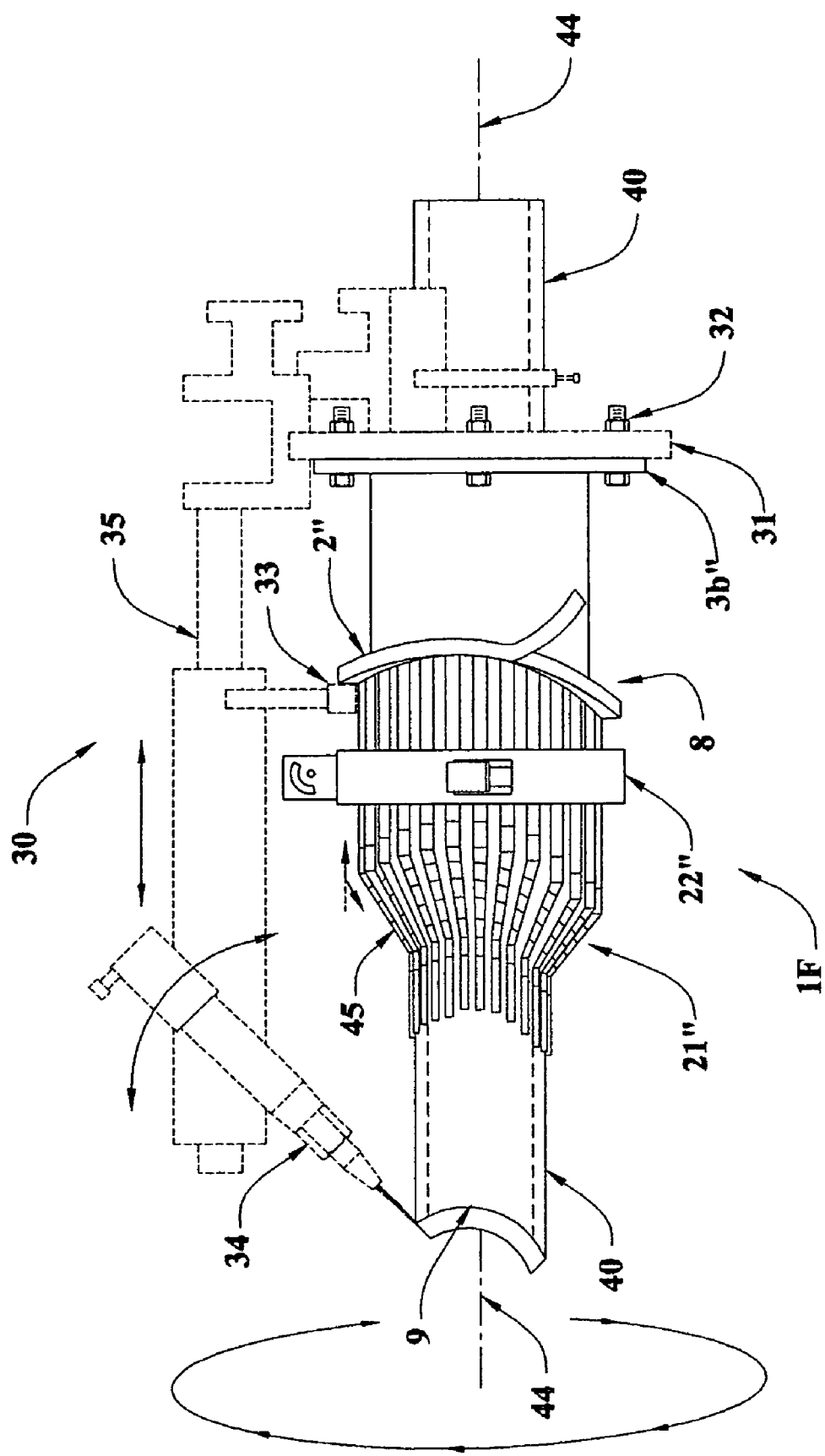
FIG. 26 shows a side view of an alternative embodiment of the universal template 1F with adjustable segmented angled portions to adjust to several diameters of pipes in use with a pipe-beveling machine 30.

In a another alternative embodiment as shown in FIG. 26 the universal template 1F may have segmented pins 21'" for adjusting the end diameter to equal that of the pipe to be cut, beveled, welded or otherwise worked on. The segments 45 can be bent downward and locked into place in selective lengths such that one template adaptor can be used for many different diameters of pipe. This eliminates the need for multiple templates for different diameter pipes. The track may also be used as before for marking a paper template or for marking directly on the sleeve 3.

Figure 27:
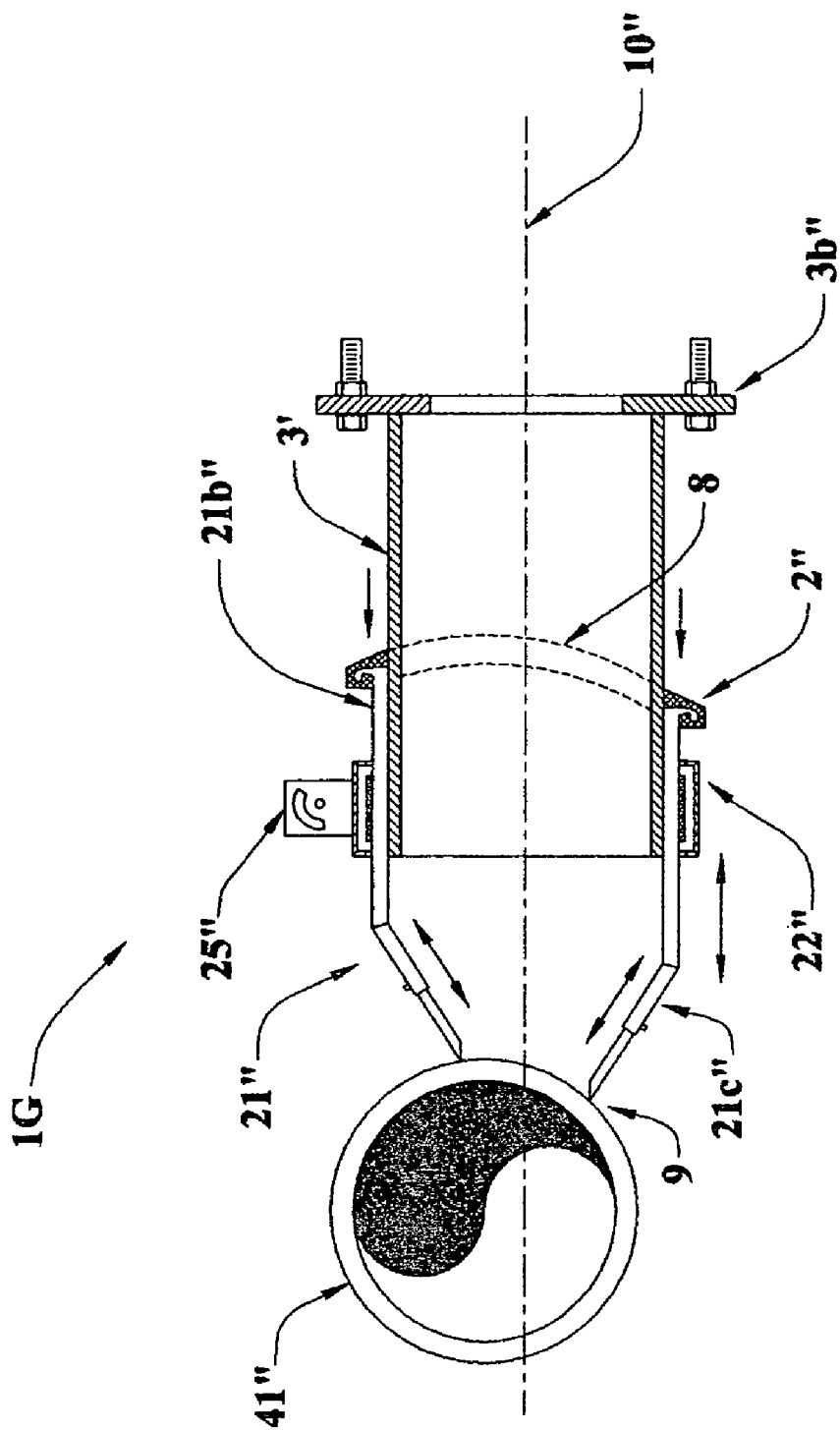
FIG. 27 shows a sectional side view of an alternative embodiment of the universal template 1G with adjustable telescoping angled portions to adjust to several diameters of pipes.

FIG. 27 shows an embodiment of the invention with the telescoping angled portion 21" pins without an additional straight portion for engaging the pipes to be measured.

Figure 28:
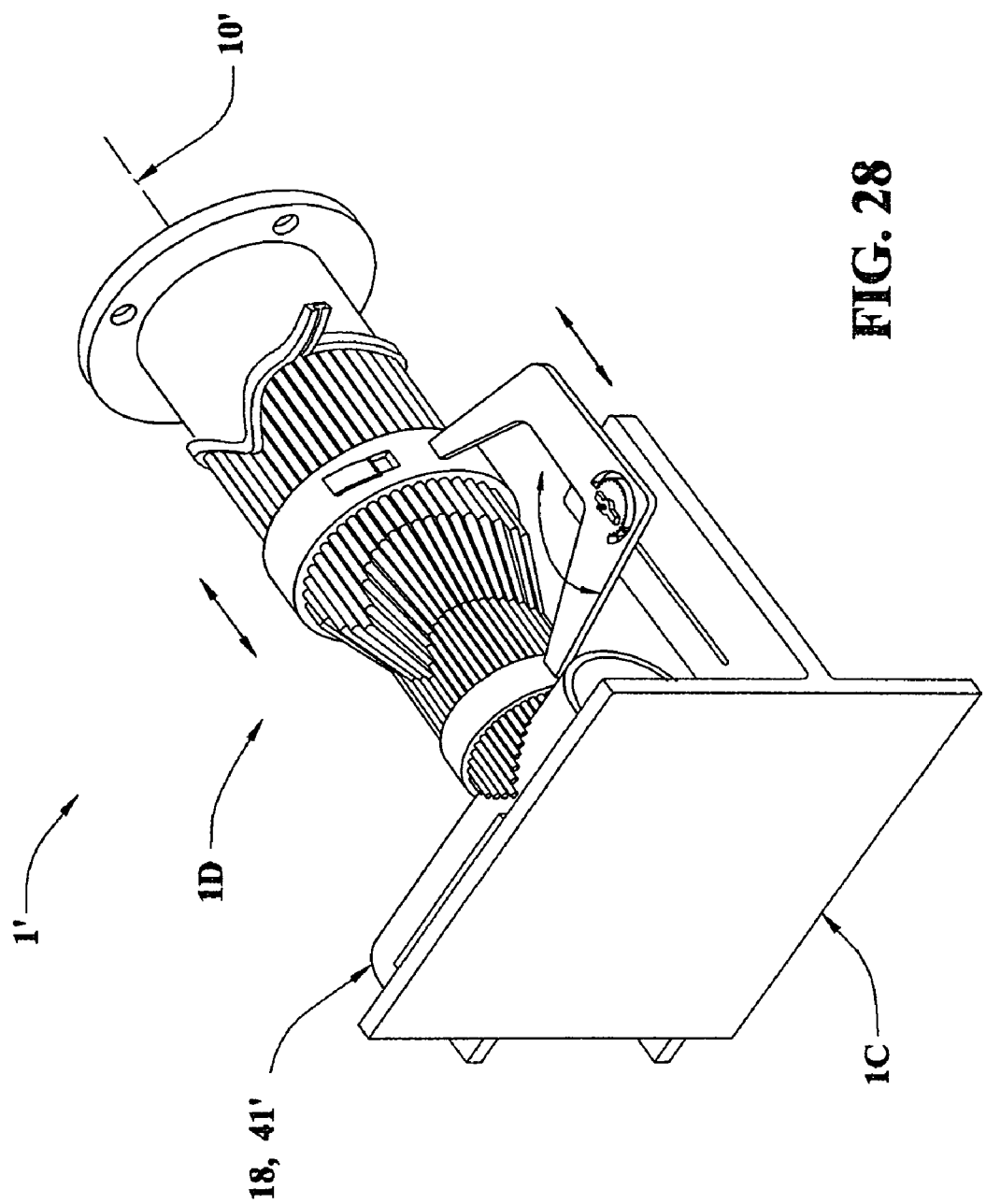
FIG. 28 shows an isometric view of the universal template 1D with the track on the end of the pins of the universal template 1D and a miter table attached.

FIG. 28 shows an embodiment of the invention with a miter table attached to the handle 25 and a curved plate 18 or a receiving component 41 on the miter table 1C. The miter table can be used with the any of the pin types shown above to obtain a template.

The tracks 2 may be applied to both ends of the pins 21 such that a smother curve may be obtained when coming in contact with the pipe to be contoured 18, 41 as well as for producing a track with a contour to follow.

One advantage of using the invention is that direct measurement of a pipe to form a template provides individual sizing for the pipe to be cut and installed. Standard size metal guide templates would not account for variations in pipe sizes or the variation of the geometry of the receiving component, or the variation of relative orientation of the connection components.

In another embodiment the diameter of the ends of the template can be adjusted by pivoting the angles portion of the pins without changing the length of the angled portion of the pins which engage the receiving component.

Figure 29:
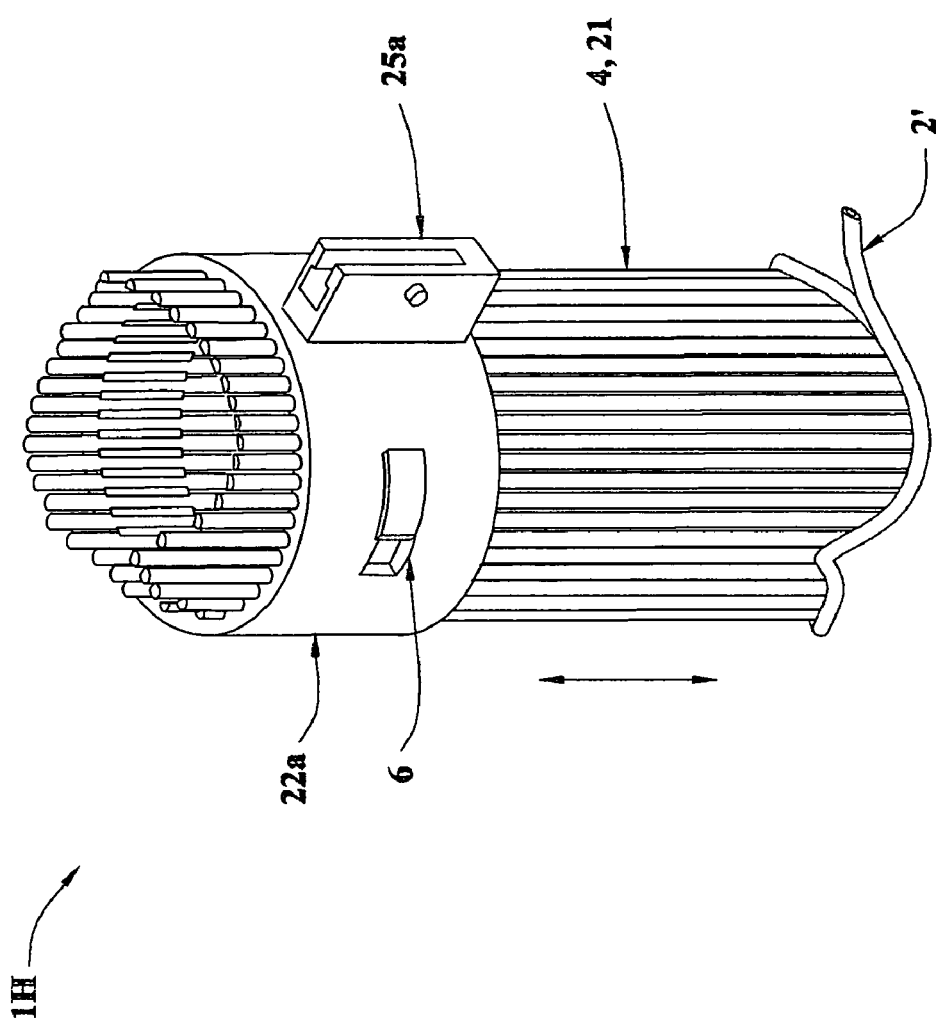
FIG. 29 shows an isometric view of the universal template 1H with a handle and a track on the end.

FIG. 29 shows an isometric view of an alternative embodiment of the universal template 1H with the track on the end. A short handle 25*a* is attached to the pin sleeve 22*a* for ease of handling. The said short handle is equipped with a slotted groove to allow engagement with an extension arm 25*b*. The flexible track is selectively placed at the end of the template trough a longitudinal slotted groove, and also has a round cross-section to allow for 3-dimensional deformation (bending in more than one plane).

Figure 30:
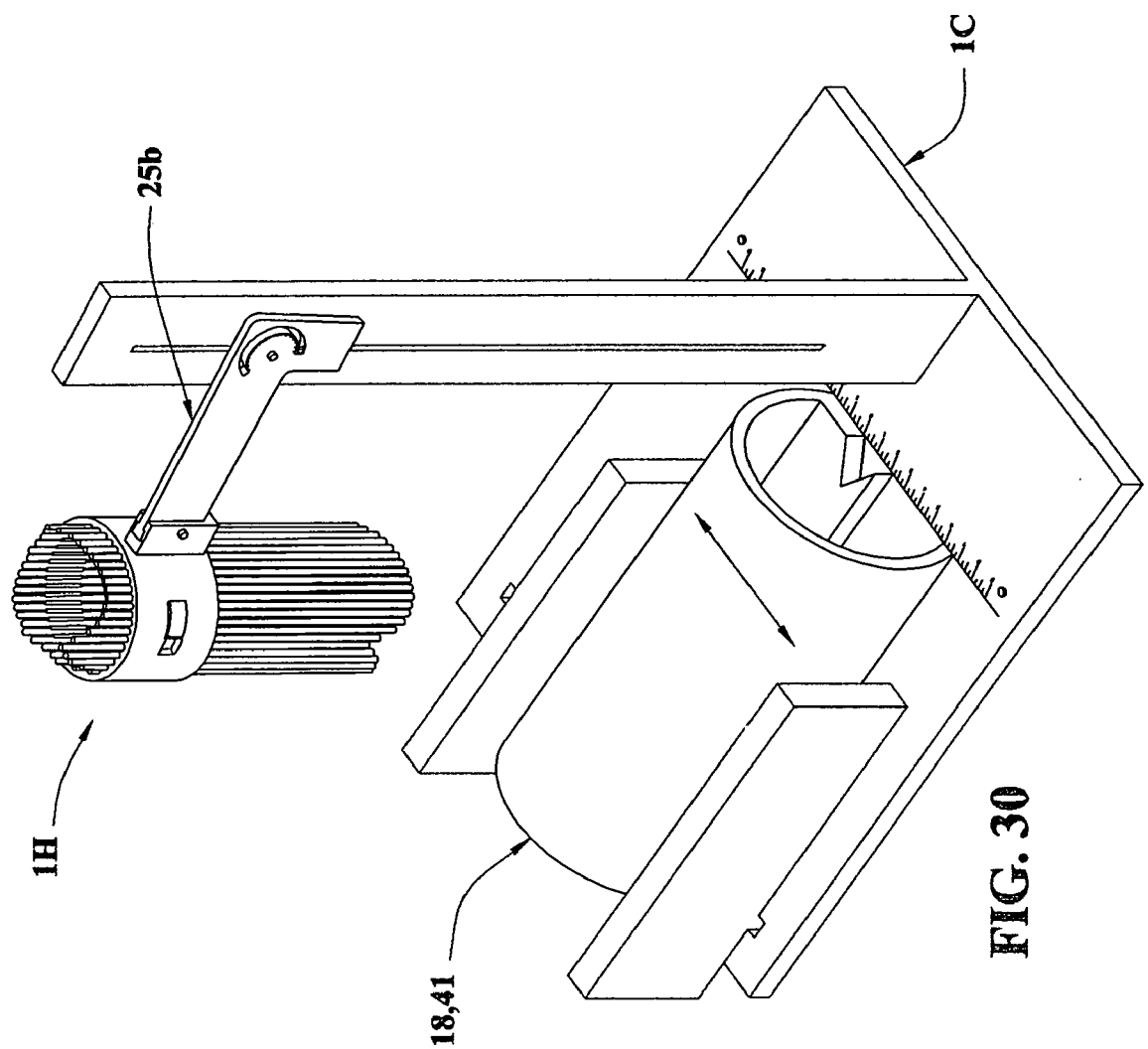
FIG. 30 shows an isometric view of the universal template 1H with the track on the end of the pins and a miter table attached via the extension arm.

FIG. 30 shows an isometric view of the universal template 1H with the track on the end of the pins and a miter table attached via the extension arm 25*b*.

Figure 31:
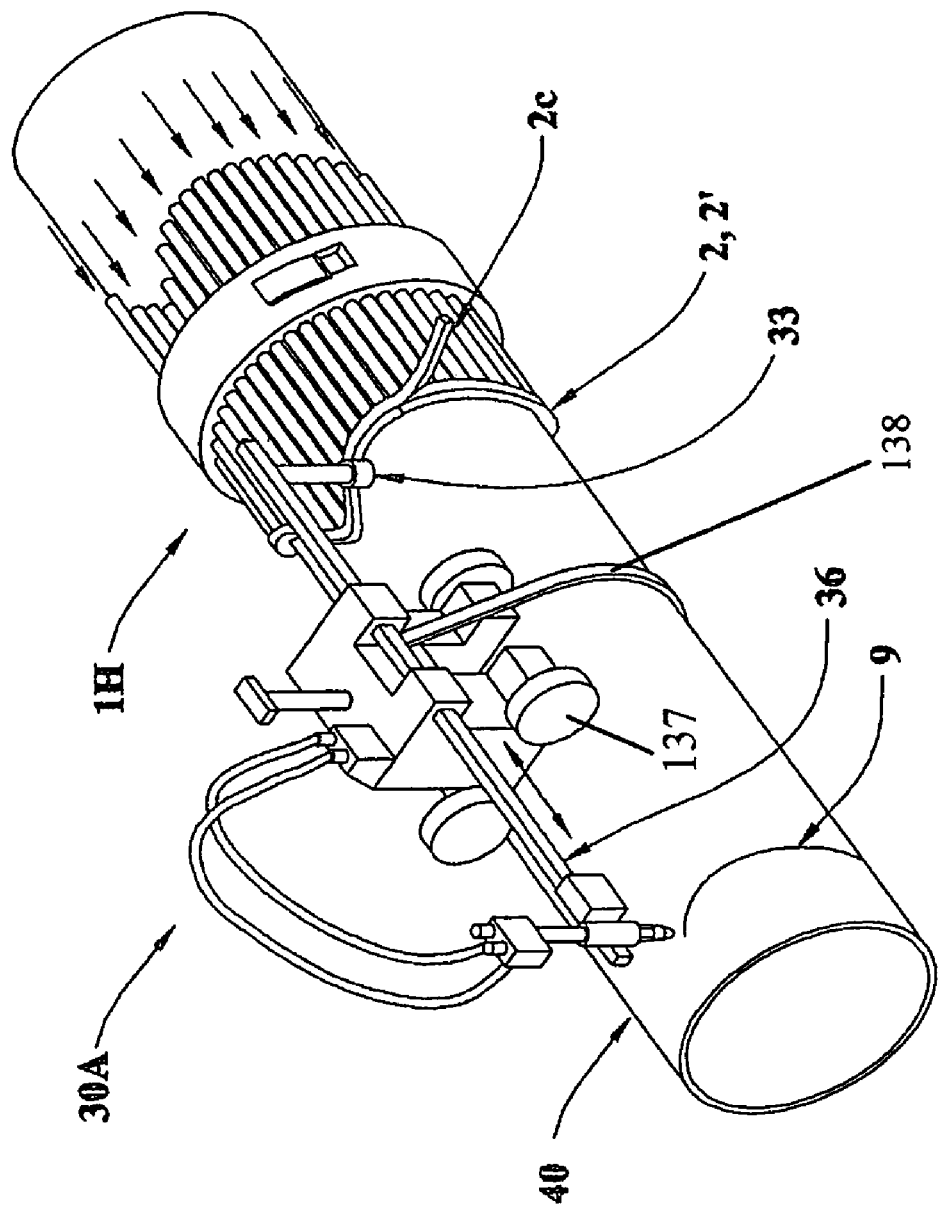
FIG. 31 shows an isometric view of the universal template 1H with the track on the end of the pins of the universal template 1H and a Chain Cutting and Beveling Machine 30A.

FIG. 31 shows an isometric view of the universal template 1H with the track on the end of the pins of the universal template 1H and a Chain Cutting and Beveling Machine 30A having wheels 137 and a chain 138 engaging the pipe and which is modified to have an adjustable torch arm mechanism 36 in order to allow the torch roller 33 to follow the flexible track to cut and bevel the pipe 40 to the desired shape.

Figure 32:
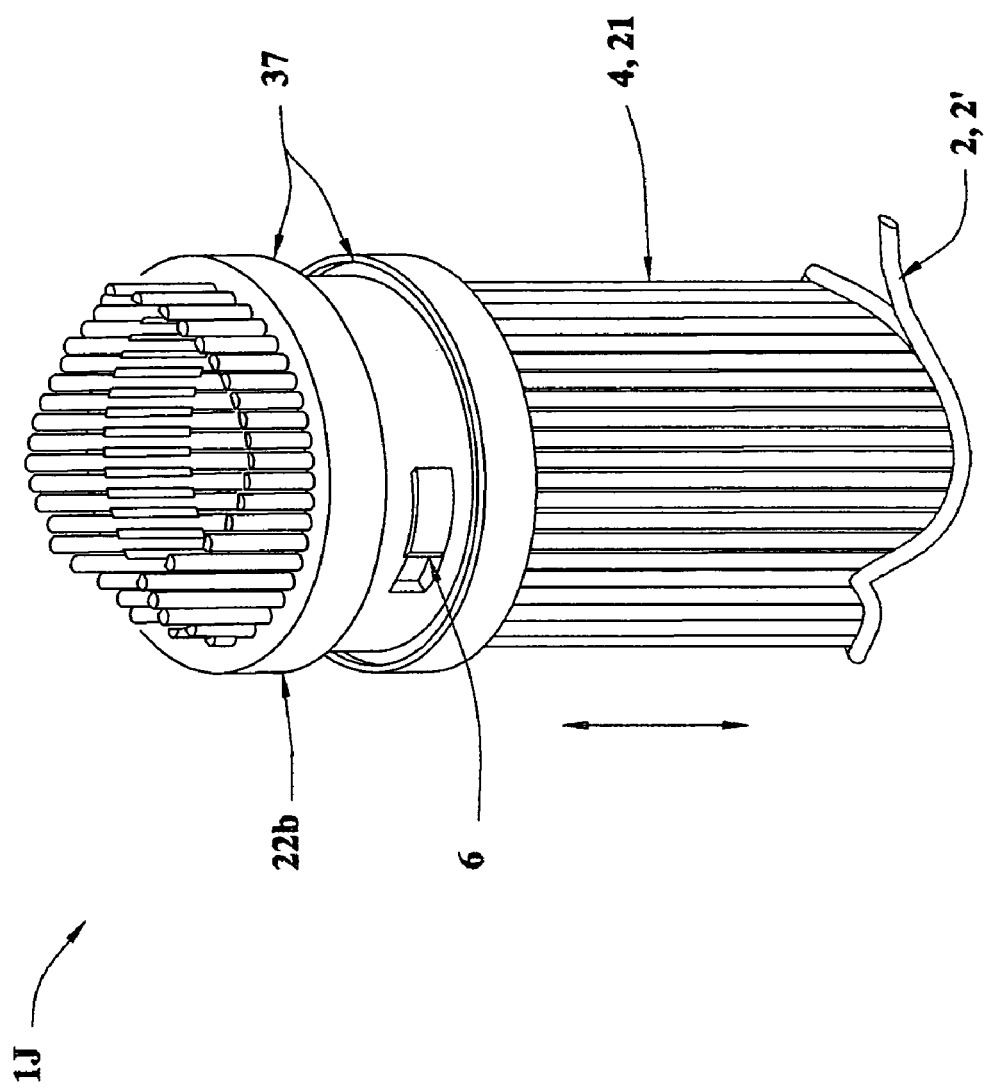
FIG. 32 shows an isometric view of the universal template 1J with the flexible track at the end of pins.

FIG. 32 shows an isometric view of an alternative embodiment of the universal template 1J with the flexible track 2. 2' is selectively placed at the end of pins. The rigid pin sleeve 22*b* is equipped to function as a circular track 37 for a working machine 30B. The said circular track guides the machine around the universal template 1J. The said pin sleeve is also equipped with a locking mechanism to lock the pins in place when needed.

Figure 33:
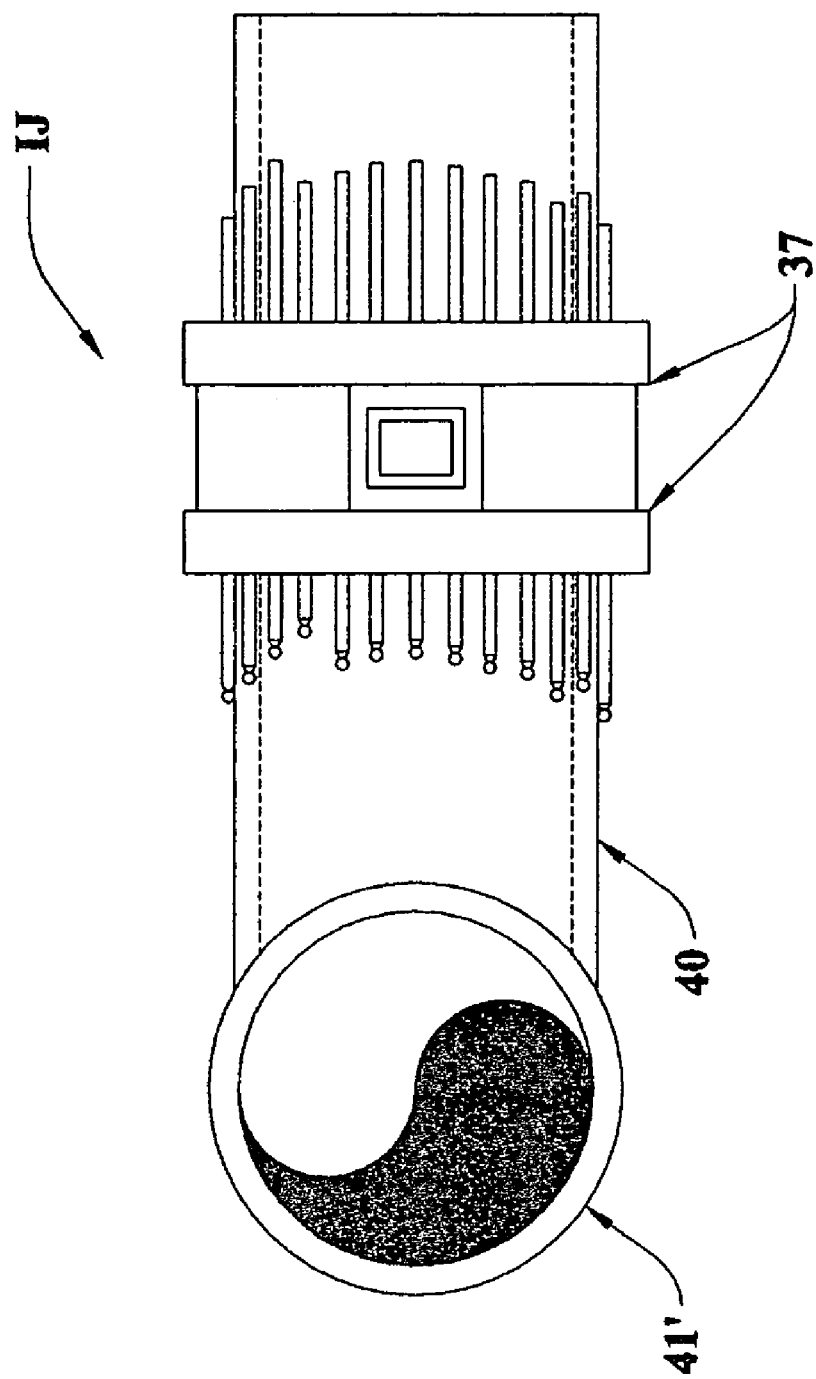
FIG. 33 shows a side view of the universal template placed around a pipe 40 adjacent a branch pipe connection.

FIG. 33 shows a side view of the universal template placed around a pipe 40 (Branch of a pipe connection) which is ready to be welded to a receiving component 41' (Run), which resembles the first step of using the universal template 1J for welding a pipe-to-pipe saddle connection.

Figure 34:
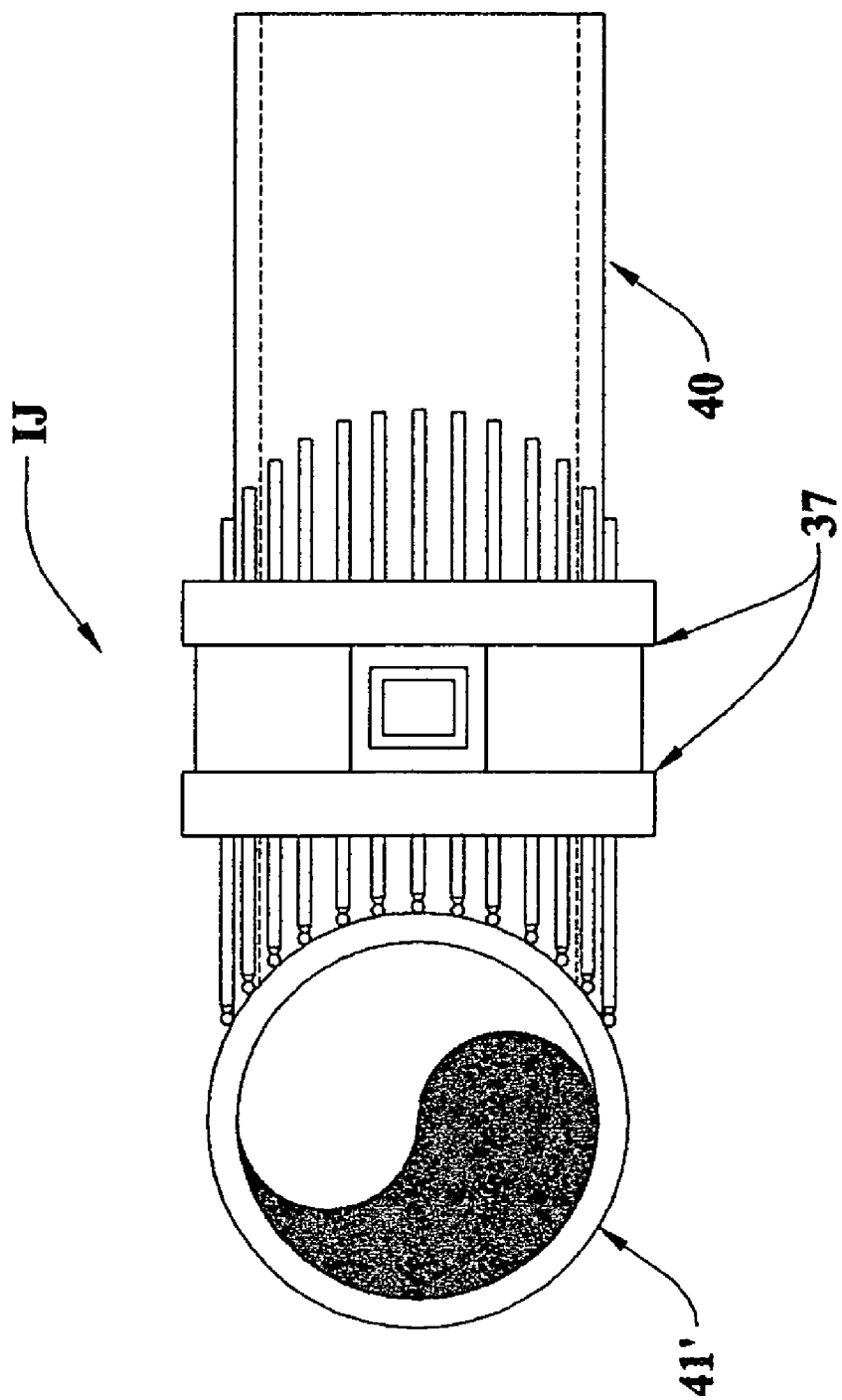
FIG. 34 shows the universal template of FIG. 33 with the pins engaging the branch pipe.

FIG. 34 resembles the second step of using the universal template 1J for welding a pipe-to-pipe saddle connection, as the pins are placed against the surface of the connection contour to register its shape.

Figure 35:
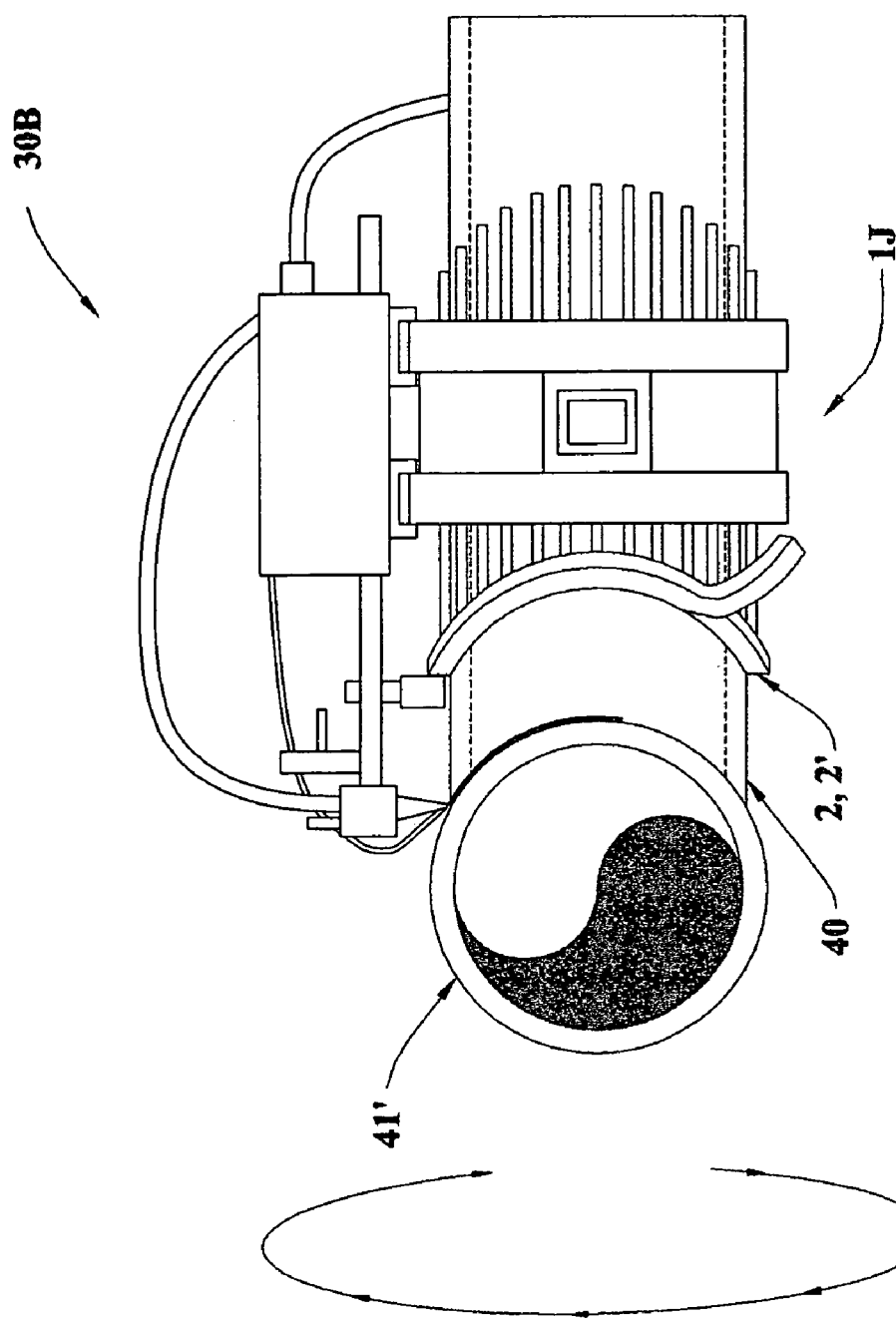
FIG. 35 shows a side view of the universal template with a Pipe Orbital Welding Device 30B welding the branch pipe.

FIG. 35 shows a side view of the universal template 1J, in use with a modified Pipe Orbital Welding Device 30B, while welding the pipe connection a long the connection contour. The orbital welding device follows the circular track 37, which is built in the pin sleeve 22*b*. The welding head is provided with longitudinally adjustable arm mechanism, which includes a small roller that follows the flexible track and guides the welding head along the contour (seam line) of the connection. FIG. 34 resembles the third step of using the universal template 1J for welding a pipe-to-pipe saddle connection.

Figure 36:
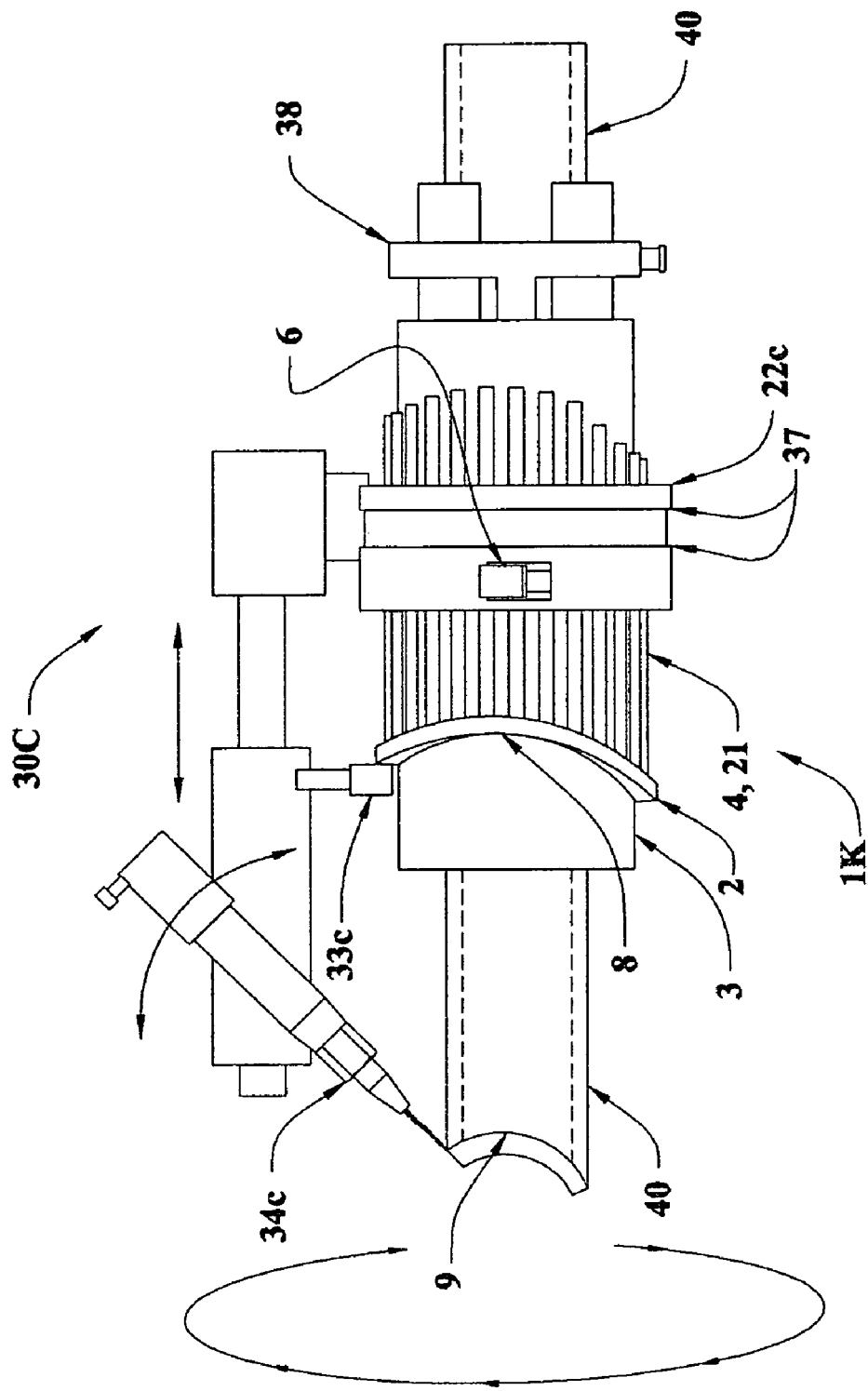
FIG. 36 shows a side view of the universal template with a Pipe Orbital working (Cutting or Welding) Device.

FIG. 36 shows a side view of the universal template 1K, in use with a modified Pipe Orbital working (Cutting or Welding) Device 30C, while cutting a pipe end to a specific contour. An array of rigid pins is placed through long guides build in the sleeve 22*c*. The pin sleeve is attached to a stationary cylindrical sleeve 3, which is equipped with a self-centering mechanism 38, which enables proper alignment around pipes of different diameters. The orbital working device follows the circular track 37, which is built in the pin sleeve 22*c*. The working device 30C is provided with longitudinally adjustable arm mechanism, which includes a small roller that follows the flexible track and guides the working head 34*c* to produce the desired contour 9.

Figure 37:
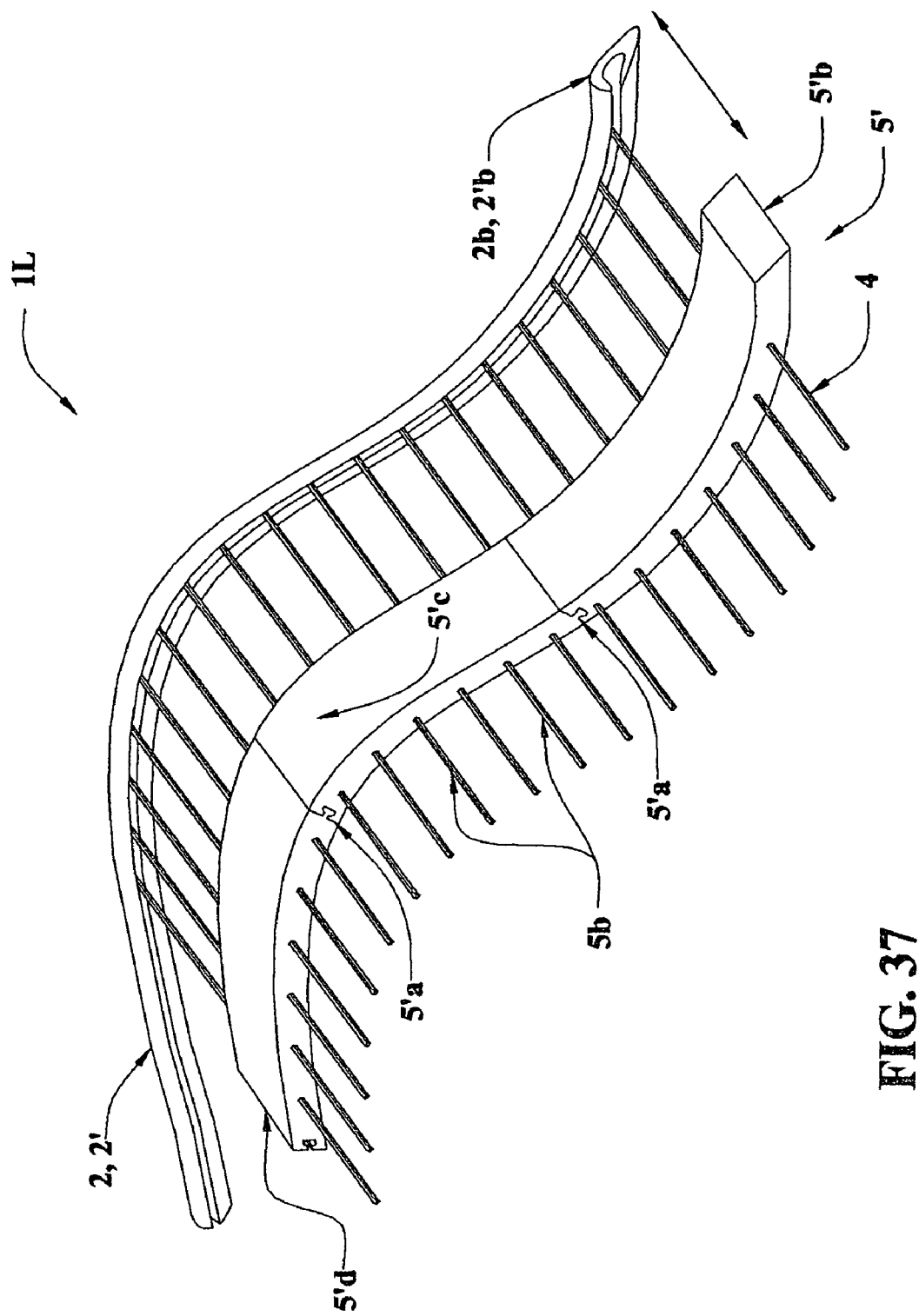
FIG. 37 shows an isometric view of a flexible universal template.

FIG. 37 shows an isometric view of an alternative embodiment of the universal template 1L, which comprised a flexible pin sleeve 5' made of several interlocking segments 5'*a*, 5'*b*, 5'*c*, wherein the first sleeve segment 5'*a* has one tapered end and the other end is equipped to interlock with another sleeve segment. The pin sleeve is of adjustable length and the user can add segments as required. An array of rigid pins is placed through long holes built in the sleeve segments wherein each pin slides independently. The template 1L is intended for use with large diameter pipes, curved plates, or any other structural members. The flexibility of the sleeve enables it to be wrapped around pipes, tubes, or other structural members. The sleeve segments can also work as a track for a working device, while the flexible track at the end of pins guides the head of the working device to replicate the contoured shape of the flexible track 2, 2'. Magnets built in sleeve segments, or other devices, are used to fix the template 1L in place while in use.

Figure 38:
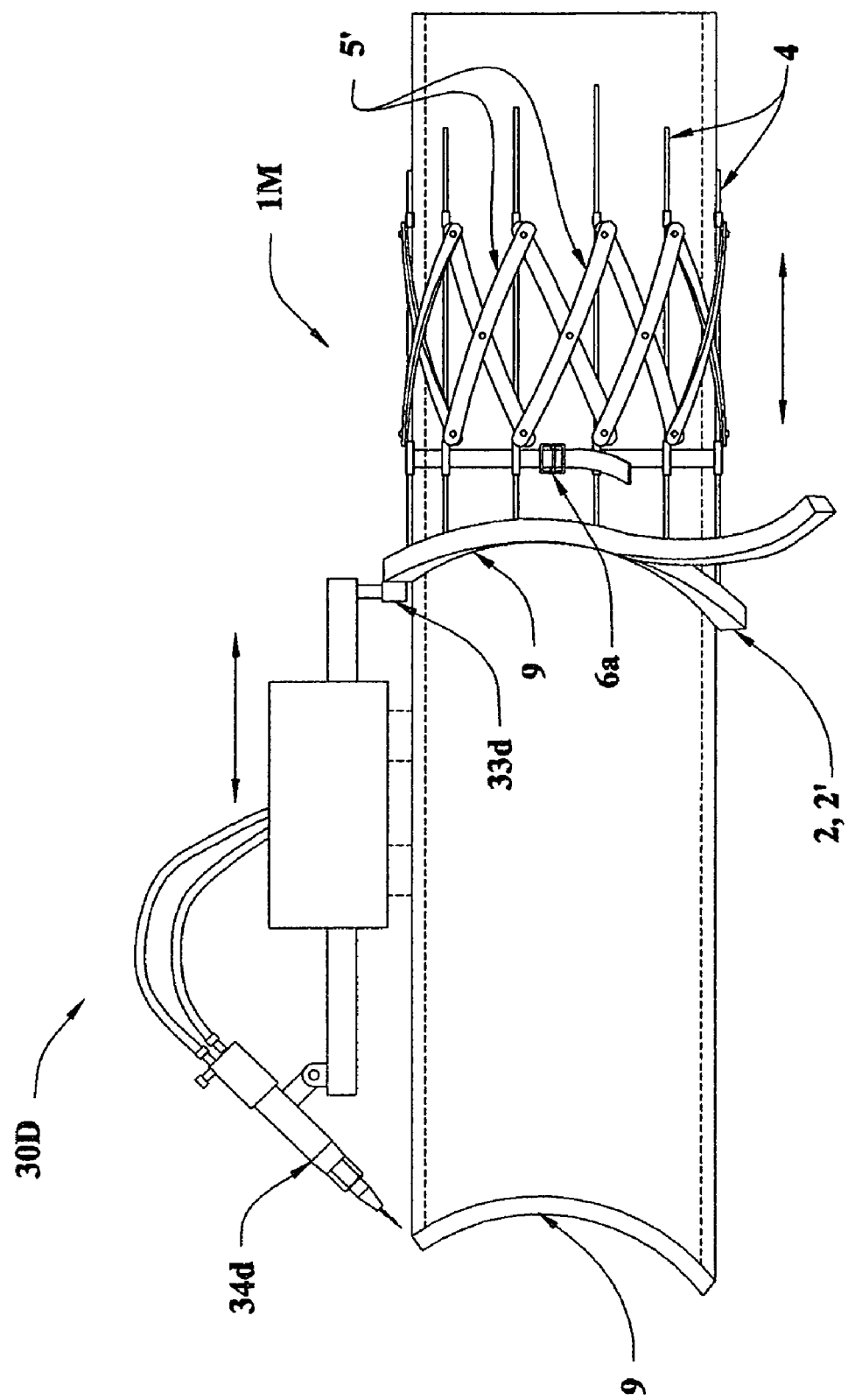
FIG. 38 shows a side view of the universal template having a sleeve with a tubular pantograph mechanism and a cutting or welding tool.

FIG. 38 shows a side view of an alternative embodiment of the universal template 1M, which comprises a sleeve 5" made in the form of a tubular pantograph mechanism. The pin sleeve is of adjustable diameter and fits a large number of pipe sizes within its range. An array of rigid pins is placed through long guides built in the sleeve segments wherein each pin slides independently. A flexible track is selectively placed at the end of pins. The pins are selectively locked in place using a locking strap 6*a* or other locking mechanisms. The template 1M is intended for use with pipe working devices. FIG. 38 shows a modified Magnetic-Wheel Pipe Cutter 30D (the Magnetic-Wheel Pipe Cutter is equipped with an adjustable arm mechanism and a tracking roller 33*d*) in use with the template 1M. The flexible track at the end of the pins guides the cutting head 34*d* of the working device to replicate the contoured shape 9 of the flexible track 2.

Figure 39:
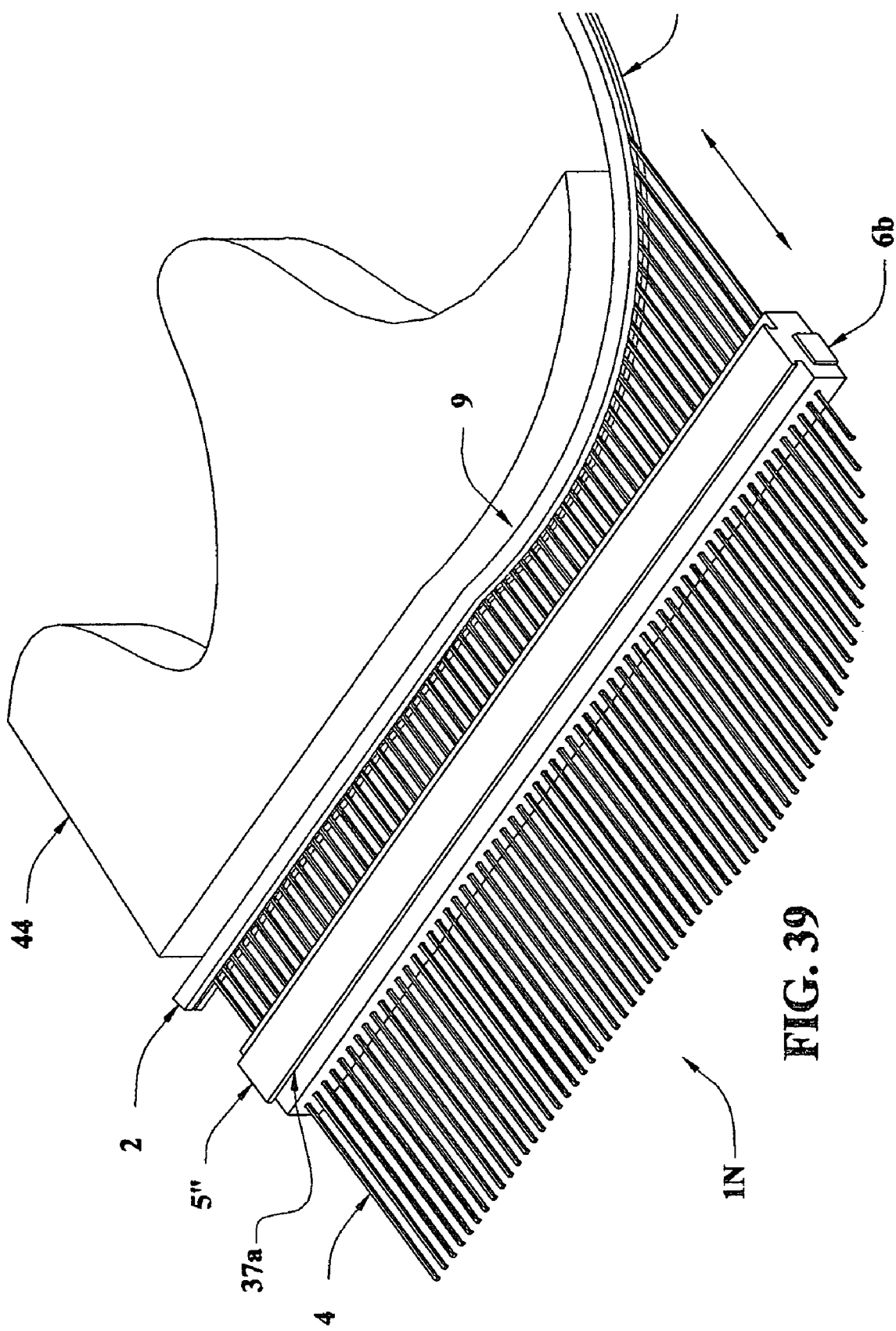
FIG. 39 shows an isometric universal template with a rigid pin sleeve.
Figure 40:
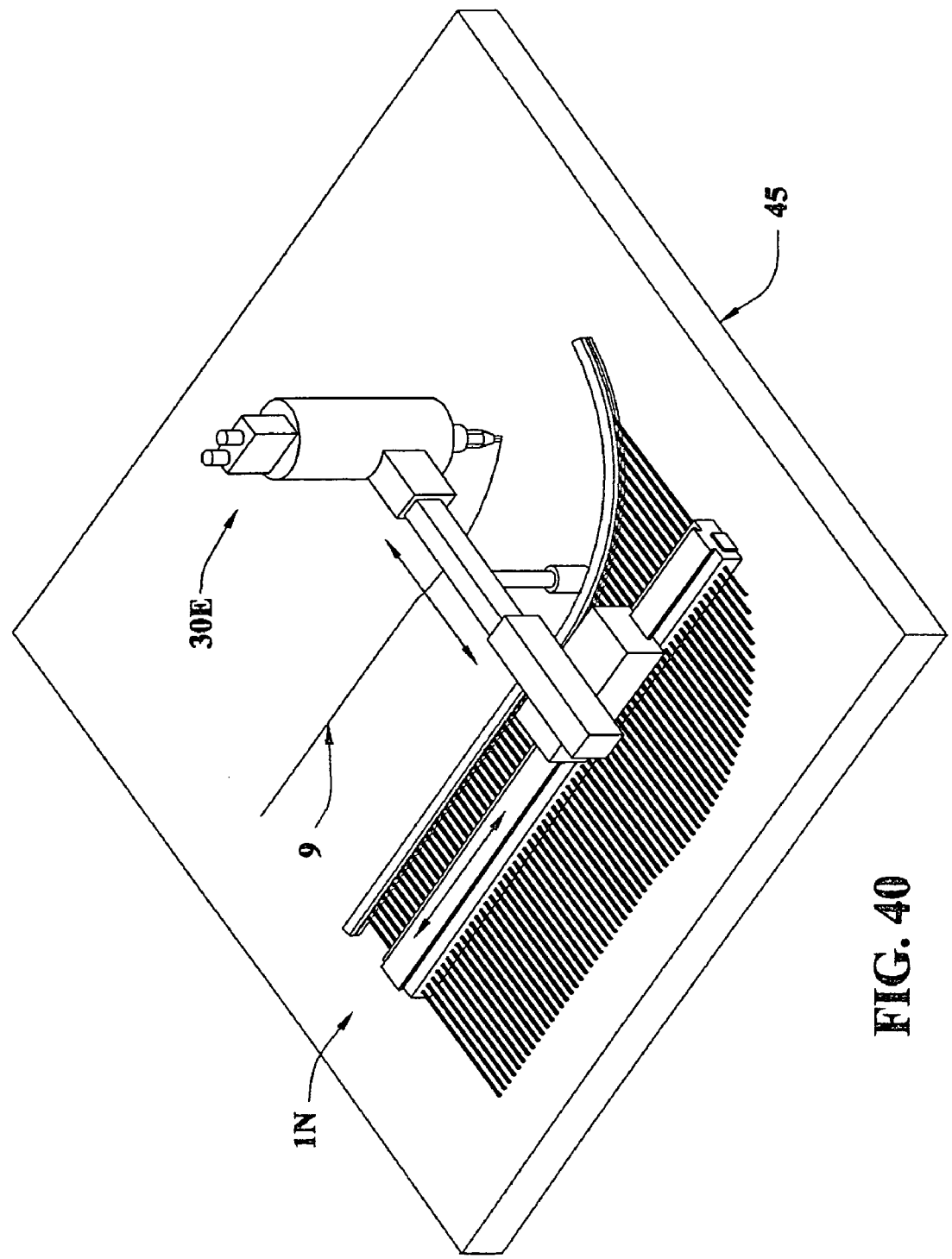
FIG. 40 shows an isometric view of the universal template in use with a working device.

FIG. 39 shows an isometric view of an alternative embodiment of the universal template 1N, which comprised a rigid pin sleeve 5". An array of rigid pins 4 is placed through long holes build in the rigid pin sleeve 5", wherein each pin 4 slides independently. The template 1N is intended to guide a machine to cut (mark, bevel, weld, or mark) flat plates, or wood boards to a specific shape 9. The template is placed against an object 44 in order to register its profile 9, and then facilitate making a replica of the said object (as shown in FIG. 40). The rigid pin sleeve works as a track for the working device 30E, while the flexible track 2 at the end of pins 4 guides the head of the working device 30E to replicate the contoured shape of the flexible track 2. Electrical magnets, built in sleeve, or other mechanical (friction) locking devices, are used to fix the template 1L ad lock the pins 4 in place while in use.

FIG. 40 shows an isometric view of the universal template 1N, while in use with a working device (a spiral saw). The template 1N is intended to guide a machine to cut (mark, engrave, bevel, weld, or perform other applications) flat plate 45, tiles, or wood boards to a specific shape. The rigid pin sleeve works as a track for the working device 30E, while the flexible track at the end of pins guides the head of the working device to replicate the contoured shape 9 of the flexible track 2. Electrical magnets, built in sleeve, or other mechanical (friction) locking devices, are used to fix the template 1N and lock the pins 4 in place while in use.

Figure 41:
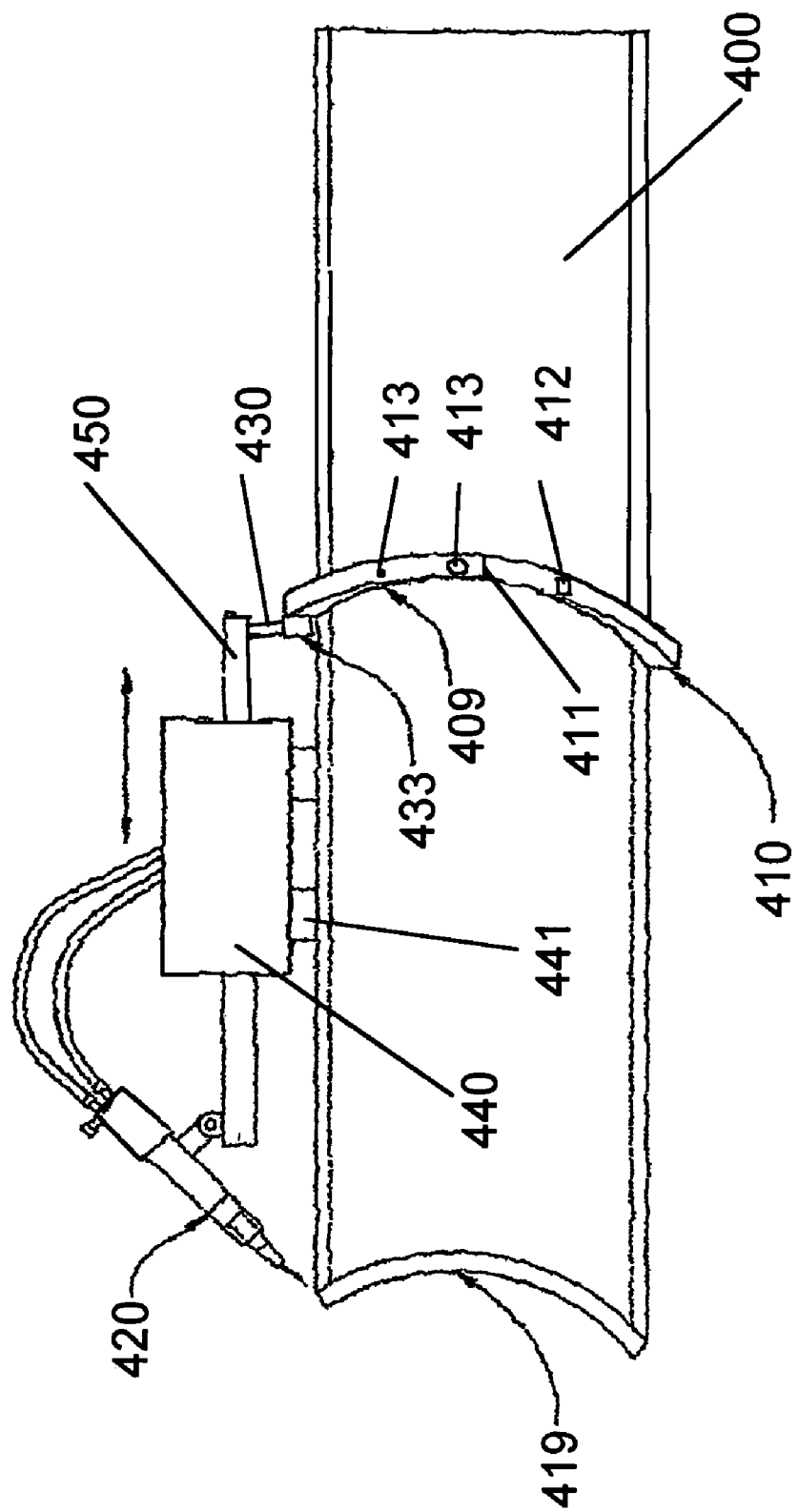
FIG. 41 shows a side view of a universal flexible template and magnetic wheel mounted tool carriage in use with a pipe-beveling machine 30.
Figure 42:
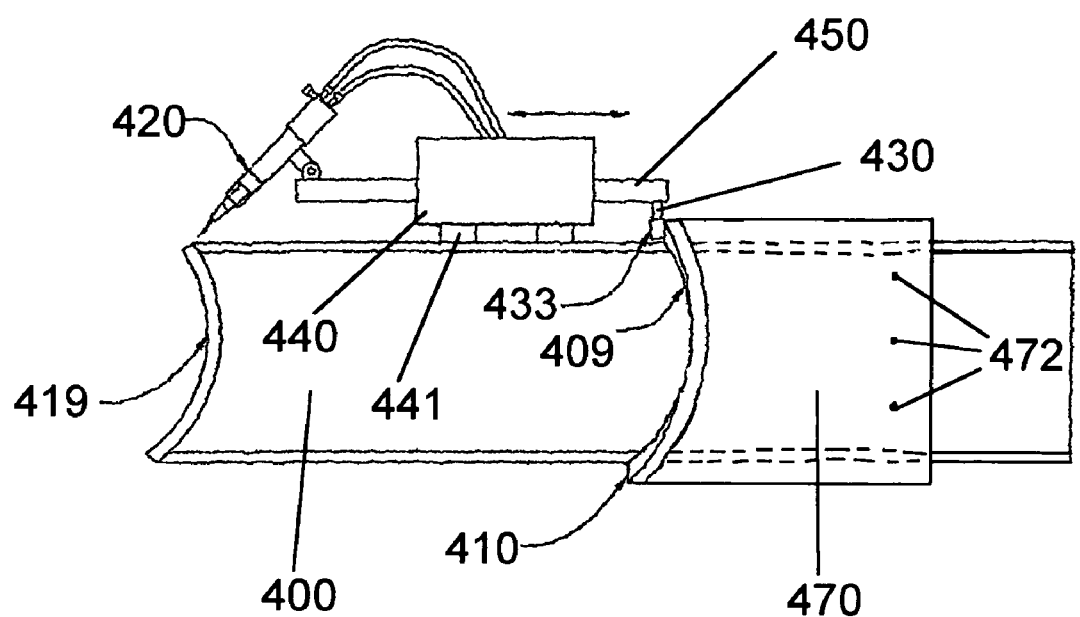
FIG. 42 shows a side view of a sleeve template and magnetic wheel mounted tool carriage in use with a pipe-beveling machine 30.
Figure 43:
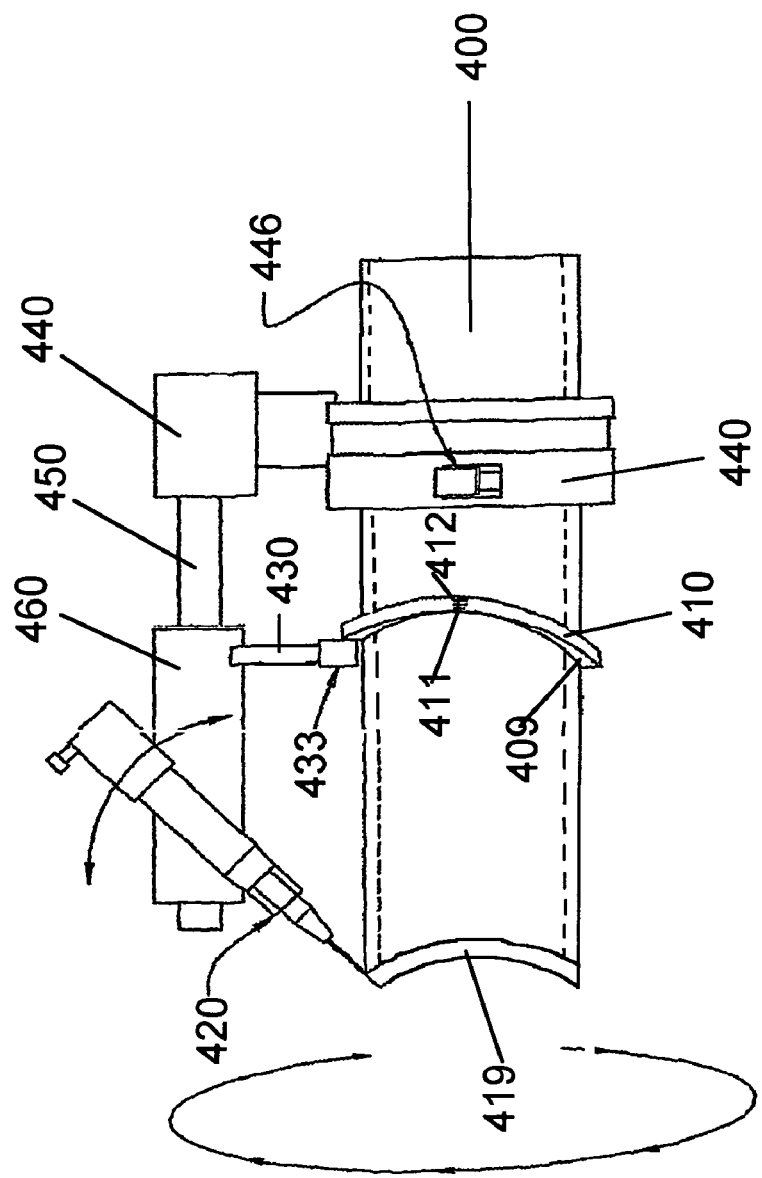
FIG. 43 shows a side view of a universal flexible template and collar mounted tool carriage in use with a pipe-beveling machine 30.

FIGS. 41, 42, and 43 show an alternative embodiment of the universal template where pins need not be used to hold the template in place.

In FIG. 41 a length flexible template 410 is measured out and cut to a desired length and attached at its ends forming a loop and having a seamless connecting point 411.

The template 410 is flexible and shaped to the desired contour 409 to guide the tool 420 on axially extending work arm 450 to make a cut 419 on the end of the workpiece 400. The template 400 is cut to the desired length and then the ends are fastened seamlessly at connecting point 411. The template can be held in place on the workpiece 400 by magnets 412 on the inner diameter of the template 410 or by suction cups on the inner diameter of the template, by screws 414 or by other fastener means. Once the template 410 is fastened to the workpiece 400 the roller 433 on tracer arm 430 engages and is urged against the template by axially extending tool arm 450. As the orbital tool carriage 440 orbits the work piece the axially extending tool arm 450 varies in axial position on the workpiece to guide the tool to cut the end of the workpiece 419 as directed by the face 409 of template 410. In the embodiment shown in FIGS. 41 and 42 the orbital tool carriage 440 has magnetic wheels 441 for engaging the workpiece and propelling the orbital tool carriage 440 around the diameter of the workpiece 400.

In the embodiment shown in FIG. 42 the template 410 is integral with and on the end of a template sleeve 470. The template sleeve 470 may be of standard contours for commonly used tool operations on workpieces 400. The template sleeve 470 may be attached to the workpiece 400 by screws or bolts 472 engaging the workpiece and holding the template sleeve 470 in place.

In the embodiment shown in FIG. 43 the orbital tool carriage 440 orbits the workpiece 400 by engaging and riding on tool carriage collar 445 which is attached to the workpiece 445. The tool carriage collar 445 has a locking mechanism 446 which secures the tool carriage collar 445 to the workpiece 400. In this embodiment the template 410 has a connecting point 411, which is held together by pins 412. The axially extending tool arm 450 in this embodiment is fixed to the orbital tool carriage 440 and an axial tool arm carriage 460 extends axially along the axially extending tool arm 450 as guided by the roller 433 engaging template face 409.

The roller 433 and the template 410 may magnetically attract to keep the roller on the template. Alternatively the template may have a wire 413 to provide a magnetic field for the roller to be attracted to.

It should be noted that the pins 4 may be held by a ridged or flexible template 1 such that the template can be either bend around an object or be fixed in position. The template may be straight, circular, oval, curved or have any desired shape.

The pipe or other object need not have a circular cross section, the pipe or other object can be oval, or square with rounded corners, rectangular with rounded corners, or other shapes so long as the pin sleeve fits around the pipe or other object.

Working tools can be attached to the template, table, pipe or other object in many ways and used to follow the guide formed by the track at the end of the pins to cut, weld or otherwise work on objects.

The working devices can be cutting spiral saw, laser, friction welding, saw blades, torches, welders, markers or any other tool.

The flexible track 2 in all the embodiments above may be made with a magnetic material in the track or with a wire for electro magnetically attracting or guiding a tool along the track.

Obviously, many modifications and variations of the present invention are possible in light of the above teachings. It is therefore to be understood that, within the scope of the appended claims, the invention may be practiced otherwise than as specifically described.

What is claimed is:

1. A template comprising:
a plurality of adjacent parallel pins forming an array,
a pin sleeve for engaging and slideably holding the pins in the array,
the pin sleeve having a locking mechanism to fix the pins in their relative positions when desired,
a flexible track attached to a first end of the pins for forming a closed loop template, the track having a first fixed end and a second free end, the first fixed end being tapered to create a smooth joint as it forms the closed loop with the second free end, so as to allow for the adjustability of the length of the track, as the pins are moved relative to each other.

2. A template as in claim 1 wherein,
the plurality of pins are cylindrically arrayed.

3. A template as in claim 2 wherein,
the pin sleeve has a guide for attaching a tool to move along the pin sleeve.

4. A template as in claim 2 wherein,
the template is attached to a cylinder,
a tool rotatably attached to the cylinder, the tool having an arm for engaging the track on the template such that the tool can follow the track on the template as it rotates on the cylinder.

5. A template as in claim 4 wherein,
the arm is magnetically attracted to contact the track on the template.

6. A template as in claim 5 wherein, the arm has a spring for urging the arm contact with the track on the template.

7. A template as in claim 2 wherein,
the sleeve is in the form of a tubular pantograph mechanism, allowing the pin sleeve to have an adjustable diameter to fit different pipe sizes.

8. A template as in claim 2 wherein,
a self centering mechanism centers the template on a cylindrical object to which it is attached.

9. A template as in claim 1 wherein,
the pin sleeve comprises connectable segments with each segment is connected to other segments for adjusting the pin sleeve length.

10. A template as in claim 1 wherein,
the pin sleeve has an engagement mechanism to attach it to an object.

11. A template as in claim 1 wherein,
the pin sleeve is flexible so it can be shaped to an object.

12. A template as in claim 1 wherein,
the track has a magnetic material for attracting and engaging an arm on a tool for guiding the tool.

13. A template as in claim 1 wherein,
the track has a wire for creating an electromagnetic field for attracting and engaging an arm on a tool for guiding the tool.

14. A template comprising:
a plurality of adjacent parallel pins forming an array,
a pin sleeve for engaging and slideably holding the pins in the array,
the pin sleeve having a locking mechanism to fix the pins in their relative positions when desired,
a flexible track attached to a first end of the pins for forming a template as the pins are moved relative to each other,
the pin sleeve has a guide for attaching a tool to move along the pin sleeve.

15. A template as in claim 14 having,
a means for fixing the template in place on a workpiece.

16. A method of forming templates for tools to use comprising:
holding a plurality of pins in a pin sleeve which fixes the pins in a radial position around a center line such that the pins form a cylinder,
attaching a smooth faced adjustable length flexible track to one end of the plurality of pins,
forming a template of the smooth faced flexible track by adjusting the length of each pin relative to the adjacent pins longitudinally along the axis of the cylinder while adjusting the length of the adjustable flexible track, and
locking the pins in position relative to the pin sleeve such that the template remains fixed,
forming a track on the pin sleeve for guiding a tool.

17. A method of forming templates for tools as in claim 16 further comprising the step of:
attaching a work tool having an arm for following the template to the pin sleeve, such that the tool can work on a workpiece by following the template.

18. A method of forming templates for tools as in claim 16 further comprising the step of:
holding a plurality of pins in a pin sleeve which fixes the pins in a radial position around a center line such that the pins form a cylinder,
forming a template of the pins by placing the pins around a component, of a pipe to pipe assembly to be welded, and allowing the pins to register the shape of the seamline to be welded;
locking the pins in position relative to the pin sleeve such that the pins remains fixed in position,
sliding the template back from the seamline of the connection, and locking it in position,
attaching a smooth faced adjustable length flexible track to one end of the plurality of pins,
attaching a welder having a tracing arm to a guide built into the template, using the track on the template to guide the tracing arm to weld the seamline of the connecting pipes.

19. A method of forming templates for tools as in claim 16 further comprising the step of:
attaching a work tool, having an adjustable length arm mechanism and a motion system, to a workpiece, such that the tool can work on the work piece by allowing the adjustable arm mechanism to follow the template while the motion system allows the work tool to maintain its relative orientation and distance to the surface work piece.

20. A method of forming and using templates for tools to use comprising:
- forming a smooth faced flexible track around a work piece by use of pins slideable in a pin sleeve to form a predetermined shape,
- locking the track in position using a locking mechanism on the pin sleeve such that the track remains fixed while maintaining the predetermined shape, attaching a work tool, having an adjustable length arm mechanism and a motion system, to the work piece, such that the tool can work on the work piece by allowing the adjustable arm mechanism to follow the track while the motion system allows the work tool to orbit the work piece and maintain its relative orientation and distance to the surface of the work piece.

21. A method of forming and using templates for tools as in claim 20 further comprising:
- an orbital motion system employing magnetic wheels to orbit the workpiece.

22. A method of forming and using templates for tools as in claim 20 further comprising:
- an orbital motion system employing a chain and wheels to orbit the workpiece.

23. A method of forming and using templates for tools as in claim 20 further comprising:
- an orbital motion system employing a circular track to orbit the workpiece.

24. A tool for orbitally working on a workpiece comprising:
- a means for attaching an orbital tool carriage to a workpiece such that the orbital tool carriage axially orbits the workpiece,
- a tool for operating on the workpiece,
- a means for axially moving the tool relative to the orbital tool carriage,
- a means for attaching an adjustable template to the workpiece, wherein the adjustable template employs a flexible track around the workpiece of a predetermined shape and a locking mechanism to keep it in place, locking the track in position using the locking mechanism such that the flexible track becomes fixed while maintaining the predetermined shape, a tracer arm for engaging and following the template on the workpiece connected to the means for axially moving the tool relative to the orbital tool carriage, such that the tool operates on the workpiece at the desired axial position as the tool orbits the workpiece.

25. A tool for orbitally working on a workpiece as in claim 24 wherein:
- the tool is attached to an axially extending tool arm which moves axially on the orbital tool carriage.

26. A tool for orbitally working on a workpiece as in claim 24 wherein:
- the tool is attached to an axially moving tool carriage which is moveably attached to an axially extending tool arm extending from the orbital tool carriage.

27. A tool for orbitally working on a workpiece as in claim 24 wherein:
- a said flexible track on the workpiece has its free ends seamlessly connected and is attached to the workpiece.

28. A method of forming and using templates for tools to use comprising:
- forming a smooth faced flexible track around a work piece of a predetermined shape,
- locking the track in position using a locking mechanism such that the flexible track becomes fixed while maintaining the predetermined shape, attaching a work tool, having an adjustable length arm mechanism and a motion system, to the work piece, such that the tool can work on the work piece by allowing the adjustable arm mechanism to follow the track while the motion system allows the work tool to orbit the work piece and maintain its relative orientation and distance to the surface of the work piece.

29. A method of forming and using templates for tools as in claim 28 further comprising:
- an orbital motion system employing magnetic wheels to orbit the workpiece.

30. A method of forming and using templates for tools as in claim 28 further comprising:
- an orbital motion system employing a chain and wheels to orbit the workpiece.

31. A method of forming and using templates for tools as in claim 28 further comprising:
- an orbital motion system employing a circular track to orbit the workpiece.

* * * * *